(12) United States Patent
Koci

(10) Patent No.: US 12,316,246 B2
(45) Date of Patent: *May 27, 2025

(54) ELECTROADHESION DEVICE HOLDER

(71) Applicant: SELFIE SNAPPER, INC., Sherman Oaks, CA (US)

(72) Inventor: Denis Koci, Sherman Oaks, CA (US)

(73) Assignee: Selfie Snapper, Inc., Sherman Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/922,983

(22) Filed: Jul. 7, 2020

(65) Prior Publication Data

US 2021/0006181 A1    Jan. 7, 2021

Related U.S. Application Data

(60) Provisional application No. 62/871,160, filed on Jul. 7, 2019, provisional application No. 62/956,054, filed on Dec. 31, 2019.

(51) Int. Cl.
*H02N 13/00* (2006.01)
*B25J 15/00* (2006.01)

(52) U.S. Cl.
CPC .......... *H02N 13/00* (2013.01); *B25J 15/0085* (2013.01)

(58) Field of Classification Search
CPC .............................. H02N 13/00; B25J 15/0085
(Continued)

(56) References Cited

U.S. PATENT DOCUMENTS 7,328,119 B1    2/2008    Pryor et al.
7,551,419 B2    6/2009    Pelrine et al.
(Continued)

FOREIGN PATENT DOCUMENTS

CN    103597519 A    2/2014
CN    203889500 U    10/2014
(Continued)

OTHER PUBLICATIONS

Guo et al., "Electroadhesion Technologies for Robotics: A Comprehensive Review," in IEEE Transactions on Robotics, vol. 36, No. 2, pp. 313-327, 15 pages, Apr. 2020, doi: 10.1109/TRO.2019.2956869.
(Continued)

*Primary Examiner* — Thienvu V Tran
*Assistant Examiner* — Sreeya Sreevatsa
(74) *Attorney, Agent, or Firm* — DLA PIPER LLP (US); Blake W. Jackson

(57) ABSTRACT

Disclosed embodiments include an electroadhesion device holder for securing devices to foreign objects and other target surfaces. In various embodiments, the electroadhesion device holder may be incorporated into a device case that removably attaches to a device. The device case may include an integrated power supply for providing power to an electroadhesion device. In various embodiments electroadhesion device holder may be attached directly to a device such as a smartphone or camera. By providing a powered, portable mechanism for securing devices to foreign objects, the electroadhesion device holder may provide a better perspective for viewing a device screen and increase the field of view of a camera.

21 Claims, 9 Drawing Sheets

(58) Field of Classification Search
USPC .......................................................... 361/234
See application file for complete search history.

(56) References Cited

U.S. PATENT DOCUMENTS

| | | | |
|---|---|---|---|
| 7,554,787 B2 | 6/2009 | Pelrine et al. | |
| 7,684,694 B2 | 3/2010 | Fromm | |
| 7,773,363 B2 | 8/2010 | Pelrine et al. | |
| 7,872,850 B2 | 1/2011 | Pelrine et al. | |
| 8,111,500 B2 | 2/2012 | Pelrine et al. | |
| 8,125,758 B2 | 2/2012 | Pelrine et al. | |
| 8,325,458 B2 | 12/2012 | Prahlad et al. | |
| D692,473 S | 10/2013 | Kawaguchi et al. | |
| 8,564,926 B2 | 10/2013 | Prahlad et al. | |
| D697,122 S | 1/2014 | Ikegame | |
| 8,665,578 B2 | 3/2014 | Pelrine et al. | |
| 8,861,171 B2 | 10/2014 | Prahlad et al. | |
| 8,982,531 B2 | 3/2015 | Prahlad et al. | |
| 9,401,668 B2 | 7/2016 | Prahlad et al. | |
| D779,577 S | 2/2017 | Ikegame | |
| D781,363 S | 3/2017 | Ikegame | |
| D797,836 S | 9/2017 | Li | |
| 9,769,332 B1 | 9/2017 | Delaunay et al. | |
| D848,512 S | 5/2019 | Kamei | |
| D849,077 S | 5/2019 | Tian | |
| 10,452,146 B2 | 10/2019 | Khoshkava et al. | |
| D876,518 S | 2/2020 | Tran et al. | |
| D887,478 S | 6/2020 | Brickner et al. | |
| D894,994 S | 9/2020 | Yu | |
| D906,399 S | 12/2020 | Wang | |
| D908,765 S | 1/2021 | Wang | |
| D916,166 S | 4/2021 | Li | |
| D939,607 S | 12/2021 | Koci | |
| 2003/0067734 A1 | 4/2003 | Nakano | |
| 2006/0010454 A1 | 1/2006 | Napoli et al. | |
| 2006/0244620 A1* | 11/2006 | Sotiriou | G08B 21/182 340/815.4 |
| 2007/0074115 A1 | 3/2007 | Patten et al. | |
| 2007/0081094 A1 | 4/2007 | Ciudad et al. | |
| 2007/0254640 A1 | 11/2007 | Bliss | |
| 2008/0037971 A1 | 2/2008 | Takami et al. | |
| 2008/0089002 A1 | 4/2008 | Pelrine et al. | |
| 2008/0211341 A1 | 9/2008 | Pelrine et al. | |
| 2009/0065348 A1 | 3/2009 | Fujii | |
| 2010/0249553 A1* | 9/2010 | MacLaughlin | A61B 5/257 600/324 |
| 2011/0193362 A1* | 8/2011 | Prahlad | B25J 15/00 294/81.2 |
| 2012/0062691 A1 | 3/2012 | Fowler et al. | |
| 2012/0120544 A1* | 5/2012 | Pelrine | H02N 13/00 361/234 |
| 2013/0242455 A1 | 9/2013 | Prahlad et al. | |
| 2013/0292303 A1 | 11/2013 | Prahlad et al. | |
| 2013/0294875 A1 | 11/2013 | Prahlad et al. | |
| 2014/0009861 A1 | 1/2014 | Tatsumi et al. | |
| 2014/0036404 A1 | 2/2014 | Prahlad et al. | |
| 2014/0085460 A1 | 3/2014 | Park et al. | |
| 2014/0108552 A1 | 4/2014 | Singh et al. | |
| 2014/0133062 A1 | 5/2014 | Prahlad et al. | |
| 2015/0138595 A1 | 5/2015 | Sugimoto | |
| 2016/0041628 A1 | 2/2016 | Verma | |
| 2016/0094078 A1 | 3/2016 | Graham et al. | |
| 2016/0100034 A1 | 4/2016 | Miller | |
| 2016/0318190 A1 | 11/2016 | Prahlad et al. | |
| 2016/0350953 A1 | 12/2016 | Mittelstaedt et al. | |
| 2017/0031235 A1 | 2/2017 | Kubotera et al. | |
| 2017/0068149 A1 | 3/2017 | Fromm | |
| 2017/0072407 A1 | 3/2017 | Prahlad et al. | |
| 2017/0291806 A1 | 10/2017 | Lessing et al. | |
| 2017/0331952 A1 | 11/2017 | Rogers et al. | |
| 2017/0372525 A1 | 12/2017 | Rosenthal et al. | |
| 2018/0054595 A1 | 2/2018 | Odamaki et al. | |
| 2018/0137523 A1 | 5/2018 | Kim et al. | |
| 2018/0350148 A1 | 12/2018 | George | |
| 2018/0356711 A1 | 12/2018 | Otsuka et al. | |
| 2019/0047157 A1 | 2/2019 | Shintake et al. | |
| 2019/0075922 A1 | 3/2019 | Rivera et al. | |
| 2019/0098190 A1 | 3/2019 | Hosoe | |
| 2019/0158136 A1* | 5/2019 | DiLella | H02J 7/0044 |
| 2019/0172743 A1 | 6/2019 | McIntyre et al. | |
| 2019/0263595 A1 | 8/2019 | Prahlad et al. | |
| 2020/0338731 A1 | 10/2020 | Lynders et al. | |
| 2021/0006181 A1 | 1/2021 | Koci | |
| 2021/0006706 A1 | 1/2021 | Koci | |
| 2021/0008416 A1 | 1/2021 | DeCarlo | |
| 2021/0203245 A1 | 7/2021 | Koci | |
| 2021/0386219 A1 | 12/2021 | Koci | |
| 2021/0387347 A1 | 12/2021 | Koci | |
| 2022/0009086 A1 | 1/2022 | Verma | |
| 2022/0174205 A1 | 6/2022 | Koci | |

FOREIGN PATENT DOCUMENTS

| | | | |
|---|---|---|---|
| EP | 2033216 A2 | 3/2009 | |
| EP | 2041784 A2 | 4/2009 | |
| EP | 2533951 A1 | 12/2012 | |
| EP | 2548299 A2 | 1/2013 | |
| EP | 2844592 A2 | 3/2015 | |
| EP | 3056016 A1 | 8/2016 | |
| EP | 3086016 A1 | 10/2016 | |
| EP | 2041784 B1 | 10/2017 | |
| EP | 3343507 A1 | 7/2018 | |
| EP | 2033216 B1 | 12/2020 | |
| JP | H07210104 A | 8/1995 | |
| JP | H08191098 A | 7/1996 | |
| JP | 2006500894 A | 1/2006 | |
| JP | 2007251083 A | 9/2007 | |
| JP | 2008282118 A | 11/2008 | |
| JP | 2009262860 A | 11/2009 | |
| JP | 2009539684 A | 11/2009 | |
| JP | 5038405 B2 | 10/2012 | |
| JP | 2012243991 A | 12/2012 | |
| JP | 2013519532 A | 5/2013 | |
| JP | 5329398 B2 | 10/2013 | |
| JP | 2014236544 A | 12/2014 | |
| JP | 5832386 B2 | 12/2015 | |
| JP | 5883430 B2 | 3/2016 | |
| JP | 5940028 B2 | 6/2016 | |
| JP | 2017511262 A | 4/2017 | |
| JP | 2017199179 A | 11/2017 | |
| JP | 6423200 B2 | 11/2018 | |
| KR | 20160131821 A | 11/2016 | |
| KR | 20220043574 A | 4/2022 | |
| WO | WO2007143662 A2 | 12/2007 | |
| WO | WO2008070201 A2 | 6/2008 | |
| WO | WO2011100028 A1 | 8/2011 | |
| WO | WO2011116357 A2 | 9/2011 | |
| WO | WO-2012150028 A1 * | 11/2012 | H02N 13/00 |
| WO | WO2013166329 A2 | 11/2013 | |

OTHER PUBLICATIONS

Savioli et al.; "Morphing electroadhesive interface to manipulate uncooperative objects", Proceedings of the SPIE, vol. 9061, id. 906129, Publication date Mar. 2014, 14 pages.

Extended European Search Report for Application No. 20837304.3, dated Oct. 4, 2023, 13 Pages.

Extended European Search Report for Application No. 20908755.0, dated Feb. 16, 2024, (13 Pages).

First Examination Report for Indian Patent Application No. 202247006152, dated Dec. 28, 2023 (6 pages).

International Preliminary Report on Patentability for International Application No. PCT/US2020/041031, mailed Jan. 20, 2022, 10 Pages.

International Preliminary Report on Patentability for International Application No. PCT/US2020/041036, mailed Jan. 20, 2022, 9 Pages.

International Preliminary Report on Patentability for International Application No. PCT/US2020/067680, mailed Apr. 19, 2022, 9 Pages.

(56) References Cited

OTHER PUBLICATIONS

International Search Report and Written Opinion for International Application No. PCT/US2020/041031, mailed Nov. 4, 2020, 12 Pages.

International Search Report and Written Opinion for International Application No. PCT/US2020/041036, mailed Oct. 26, 2020, 11 Pages.

International Search Report and Written Opinion for International Application No. PCT/US2020/067680, mailed May 7, 2021, 11 Pages.

International Search Report and Written Opinion for International Application No. PCT/US2021/037099, mailed Sep. 16, 2021, 13 Pages.

International Search Report and Written Opinion for International Application No. PCT/US2021/037125, mailed Sep. 22, 2021, 11 Pages.

Office Action for Canadian Patent Application No. 3163370, mailed Mar. 19, 2024, 4 pages.

Yuan M., et al., "A Mixed Reality Virtual Clothes Try-on System," IEEE Transaction on Multimedia, Dec. 2013, vol. 15, No. 8, 11 pages.

Amazon, What is an API (Application Programming Interface), downloaded on Oct. 15, 2024, 6 pages, Retrieved from the Internet URL: https://aws.amazon.com/whatis/api/#:~:text=APIs%20are%20mechanisms%20that%20enable,use%20Simple%20Object%20Access%20Protocol.

Office Action for Japanese Patent Application No. 2022501135, mailed Jun. 13, 2024, 13 pages.

Examination Report No. 1 for Australian Patent Application No. 2020309528 dated Jan. 14, 2025, 4 pages.

Office Action for Japanese Patent Application No. 2022-540681, mailed Dec. 2, 2024, 13 pages.

Office Action for Korean Patent Application No. 10-2022-7004022 mailed Nov. 25, 2024, 24 pages.

\* cited by examiner

ELECTROADHESION DEVICE HOLDER

PRIORITY CLAIM

This application claims the benefit of U.S. Provisional Application 62/871,160 filed on Jul. 7, 2019, the entire contents of which is hereby incorporated by reference. This application also claims the benefit of U.S. Provisional Application 62/956,054 filed on Dec. 31, 2019, the entire contents of which is hereby incorporated by reference.

FIELD

The present disclosure relates generally to mounting and securing objects, in particular, devices for mounting electronics devices to foreign objects and other target surfaces.

BACKGROUND

Mounting electronic devices to walls, furniture, trees, mirrors, windows, and other foreign objects and or target surfaces can optimize existing device functions and provide new functionality. Viewing and listening to content, taking pictures, communicating with others, and other every day uses of electronics devices are typically personal activities that are difficult to share with others. It is also difficult to multitask when using an electronics device because at least one hand is occupied by holding the device. Moreover, millions of electronics devices are broken every year because they fall from unsecured locations. There is therefore a need to develop a device holder that secures electronics devices to a fixed location on a foreign object and or other target surface, allows devices to be used hands free, and facilitates group interactions with devices.

Previous attempts have been made to solve problems with mounting and securing electronics devices to foreign objects and other target surfaces, but mechanical mounting mechanisms are unreliable and bulky. Mechanical mounting mechanisms also require time and effort to assemble and attach to an electronics device. Sometimes electronics devices can be damaged while attaching a mounting mechanism because screws, clamps, clips, and other components of the mounting mechanism can forcefully contact a screen or other fragile component of an electronics device and scratch, break, dent, or otherwise damage the electronics device. Many mechanical mounting systems are bulky and must be permanently or semi-permanently attached to a foreign object or other target surface. When an electronics device is not attached to the mounting system or removed from the mounting system, the mounting system is exposed and looks ugly. Mechanical mounting systems may also damage the foreign object they are fixed to during attachment and if the foreign object fails to support the weight of the mounting system and/or electronics device. No portable, powered mounting systems have been explored for electronics devices.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION OF ONE OR MORE EMBODIMENTS

As used herein, the terms "device" and "devices" refers to any object having and electrical component including smartphones, computers, laptops, televisions, cameras, and the like.

As used herein, the terms "a piece of content" and "pieces of content" refer to images, videos, audio records, and other audiovisual works capable of being captured by—and viewed on—an electronics device.

As used herein, the terms "foreign object" and "foreign objects" refer to walls, furniture, trees, mirrors, windows, and any other object and/or target surface with an exposed area to attach an electronics device of any size. Attachment surfaces included in foreign objects may be rough or smooth and foreign objects may be comprised of one or more conductive and/or non-conductive materials.

EXEMPLARY EMBODIMENTS OF THE SYSTEM

Figure 1:
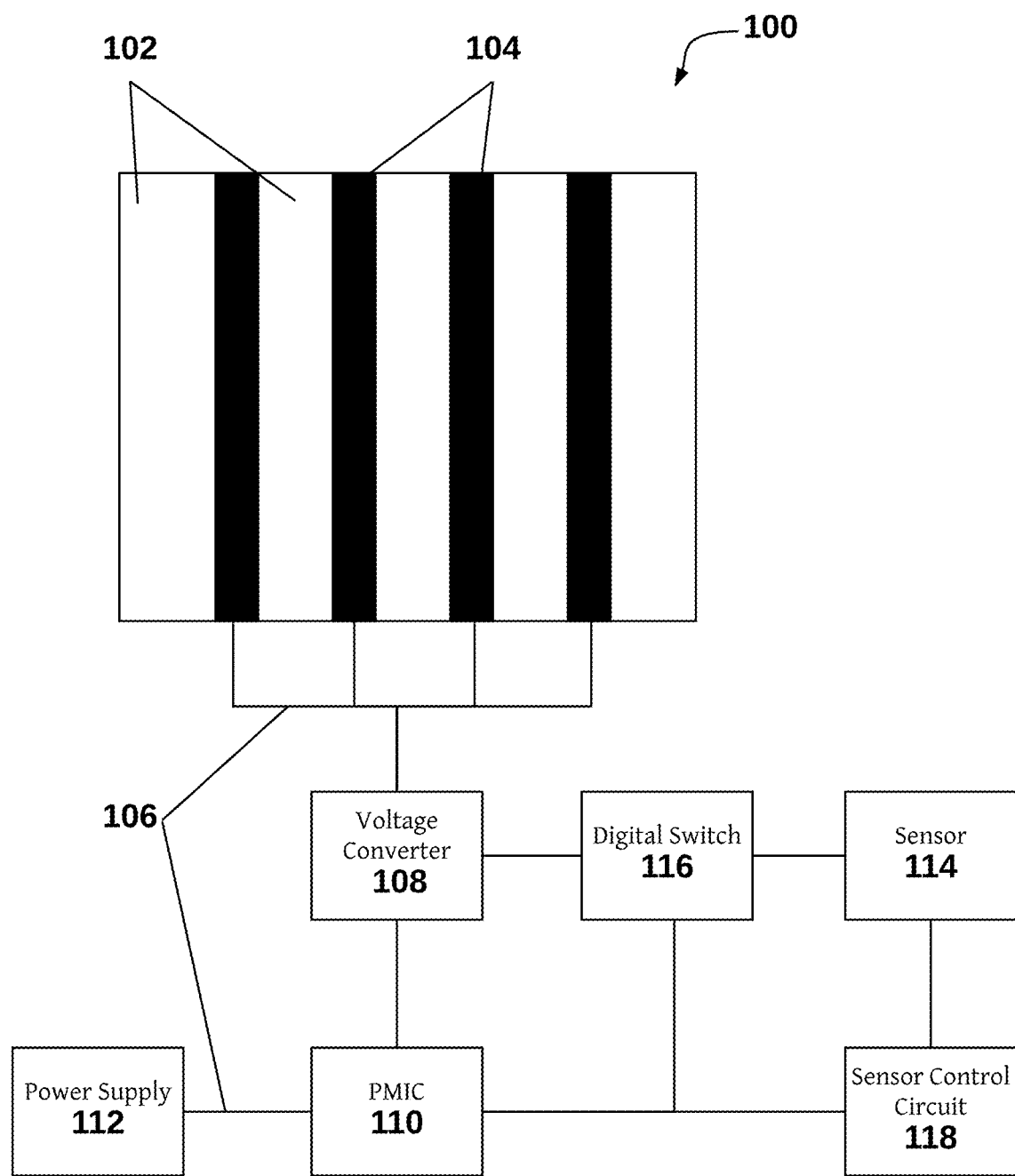
FIG. 1 illustrates an exemplary electroadhesion device for holding an electronics device.
Figure 2:
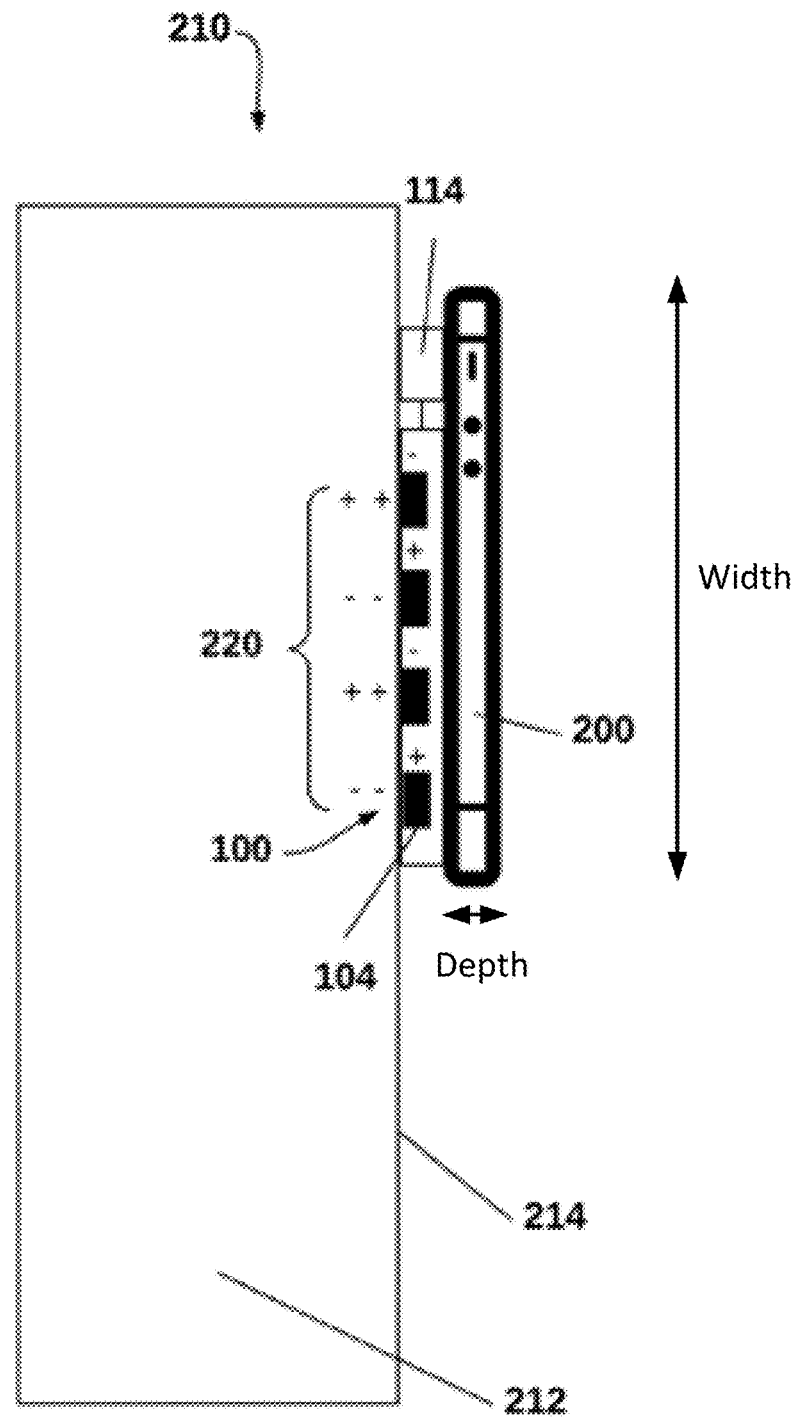
FIG. 2 illustrates an electronics device mounted to a foreign object using the exemplary electroadhesion system shown in FIG. 1.

FIGS. 1-2 illustrate exemplary electroadhesion devices and systems that may be incorporated into a device holder for securing a device to a foreign object. Embodiments of device holders using the electroadhesion system may be removably attached and/or built into the back of a device to enable quick and secure attachment to a variety of surfaces. Attaching a device to a foreign object using the electroadhesion mounting system allows multiple people to interact with devices, enables devices to be used hands free, and secures devices to a fixed location to prevent devices from falling, being misplaces, and getting damaged.

FIG. 1 illustrates an electroadhesion device 100 that may be included in the device holder. In various embodiments, the electroadhesion device 100 can be implemented as a compliant film comprising one or more electrodes 104 and an insulating material 102 between the electrodes 104 and a case and/or device. The electroadhesive film may include a chemical adhesive applied to the insulating material 102 and/or electrodes 104 to allow the electroadhesion device 100 to be attached to a case and/or device. Additional attachment mechanisms used to secure the electroadhesion device 100 to a case and/or device can include a mechanical fastener, a heat fastener (e.g., welded, spot welded, or spot-melted location); dry adhesion; Velcro; suction/vacuum adhesion; magnetic or electromagnetic attachment or tape (e.g.: single- or double-sided). Depending on the degree or device portability desired or needed for a given situation and the size of the electroadhesion device, the attachment mechanism may create a permanent, temporary, or even removable form of attachment.

The insulating material 102 may be comprised of several different layers of insulators. For purposes of illustration, the electroadhesion device 100 is shown as having four electrodes in two pairs, although it will be readily appreciated that more or fewer electrodes can be used in a given electroadhesion device 100. Where only a single electrode is used in a given electroadhesion device 100, a complimentary electroadhesion device 100 having at least one electrode of the opposite polarity is preferably used therewith. With respect to size, electroadhesion device 100 is substantially scale invariant. That is, electroadhesion device 100 sizes may range from less than 1 square centimeter to greater than several meters in surface area. Even larger and smaller surface areas are also possible and may be sized to the needs of a given device.

In various embodiments, the electroadhesion device 100 may cover the entire rear surface of a device. One or more electrodes 104 may be connected to a power supply 112 (e.g., battery, AC power supply, DC, power supply and the like) using one or more known electrical connections 106. A power management integrated circuit 110 may manage power supply 112 output, regulate voltage, and control power supply 112 changing functions. To create an electroadhesive force that provides sufficient electroadhesive attraction to support a device, low voltage power from a power supply 112 must be converted into high voltage charges at the one or more electrodes 104 using a voltage converter 108. The high voltages on the one or more electrodes 104 form an electric field that interacts with a foreign object and or other target surface in contact with—and/or proximate to—the electroadhesion device 100. The electric field may locally polarize the target surface and/or induce electric charges on the target surface that are opposite to the charge on the one or more electrodes 104. The opposite charges on the one or more electrodes 104 and the target surface attract to cause electroadhesion between the electrodes 104 and the target surface. The induced charges may be the result of a dielectric polarization or from weakly conductive materials and electrostatic induction of charge. In the event that the target surface comprises a material that is a strong conductor, such as copper for example, the induced charges may completely cancel the electric field. In this case, the internal electric field is zero, but the induced charges nonetheless still form and provide electroadhesive force (i.e., Lorentz forces) to the electroadhesion device 100.

Thus, the adjustable voltage applied to the one or more electrodes 104 provides an overall electroadhesive force between the electroadhesion device 100 and the material of the foreign object and or other target surface. The electroadhesive force holds the electroadhesion device 100 on the target surface. The overall electroadhesive force may be sufficient to overcome the gravitational pull on the electroadhesion device 100 and a consumer device or other object attached to the electroadhesion device 100. Therefore, the electroadhesive force may be used to hold a consumer device mounted with the electroadhesion device 100 aloft on the target surface. In various embodiments, a plurality of electroadhesion devices may be placed against target surface, such that additional electroadhesive forces against the target surface can be provided. The combination of electroadhesive forces may be sufficient to lift, move, pick and place, mount, or secure a large object on the target surface.

Removal of the adjustable voltages from the one or more electrodes 104 ceases the electroadhesive force between electroadhesion device 100 and the target surface. Thus, when there is no adjustable voltage between the one or more electrodes 104, the electroadhesion device 100 can move more readily relative to the target surface. This condition allows the electroadhesion device 100 to move before and after an adjustable voltage is applied. Well controlled electrical activation and de-activation enables fast adhesion and detachment, such as response times less than about 50 milliseconds, for example, while consuming relatively small amounts of power.

Applying too much voltage to certain materials (e.g., metals and other conductors) can cause sparks, fires, electric shocks, and other hazards. Applying too little voltage generates a weak electroadhesive force that is not strong enough to securely attach the electroadhesion device 100 to the target surface. To ensure the proper adjustable voltage is generated and applied to the electrodes 104 to generate a sufficient electroadhesive force, a digital switch 116 may autonomously control the voltage converter 108. The digital switch 116 may control the voltage output of the voltage converter 108 based on sensor data collected by one or more sensors 114 included in the electroadhesion device 100. The digital switch 116 may be a microcontroller or other integrated circuit including programmable logic for receiving sensor data, determining one or more characteristics based on the sensor data, and controlling the voltage converter based on the one or more characteristics. The digital switch 116 may operate the voltage converter 108 to generate, modify, set, and/or maintain an adjustable output voltage used to attach the electroadhesion device 100 to a target surface.

For example, in response to detecting a conductive target surface (e.g., metal) by the sensor 114, the digital switch 116 may cause the voltage converter 108 to generate an adjustable voltage sufficient to attach and secure the electroadhesion device 100 to the conductive target surface. The adjustable voltage output may also be safe to apply to conductive surfaces and may eliminate sparks, fires, or other hazards that are created when an electroadhesion device 100 that is generating a high voltage contacts and/or is placed close to a conductive target surface. Similarly, when the sensor 114 detects a different surface with different characteristics, the digital switch 116 controls the voltage converter 108 to generate a different adjustable voltage that is sufficient to attach and secure the electroadhesion device 100 to that different surface. For example, in response to detecting an organic target surface (e.g., wood, drywall, fabric, and the like) by the sensor 114, the digital switch 116 may cause the voltage converter 108 to generate an adjustable voltage that may be sufficient to attach and secure the electroadhesion device to the organic target surface without creating hazards. The adjustable voltage may also minimize the voltage output to avoid hazards that may be created when the electroadhesion device 100 is accidently moved. In response to detecting a smooth target surface (e.g., glass) or an insulating target surface (e.g., plastic, stone, sheetrock, ceramics, and the like) by the sensor 114, the digital switch 116 may cause the voltage converter 108 to generate an adjustable voltage sufficient to attach and secure the electroadhesion device 100 to the smooth and/or insulating target surface without creating hazards. Thus, the electroadhesion device 100 has an adjustable voltage level that is adjusted based on a characteristic of the target surface determined by the sensor 114 resulting in a electroadhesion device 100 that can be safely used to attach to various target surfaces without safety hazards.

The strength (i.e. amount of voltage) of the adjustable voltage may vary depending on the material of the target surface. For example, the strength of the adjustable voltage required to attach the electroadhesion device 100 to a conductive target surface (e.g., metal) may be less than the adjustable voltage required to attach the electroadhesion device 100 to an insulating target surface, a smooth target surface, and/or an organic target surface. The strength of the adjustable voltage required to attach the electroadhesion device 100 to an organic target surface may be greater than the adjustable voltage required to attach the electroadhesion device 100 to a conductive target surface and less than the adjustable voltage require to attach the electroadhesion device 100 to an insulating target surface. The strength of the adjustable voltage required to attach the electroadhesion device 100 to an insulating target surface may be higher than the adjustable voltage required to attach the electroadhesion device 100 to an organic target surface or a conductive target surface. The electroadhesion device 100 may be configured to attach to any type of surface (e.g., metallic, organic, rough, smooth, undulating, insulating, conductive, and like). In some embodiments, it may be preferable to attach the electroadhesion device 100 to a smooth, flat surface.

Attaching the electroadhesion device 100 to some target surfaces requires a very high voltage. For example, a very high voltage output may be required to attach the electroadhesion device 100 to a rough target surface, a very smooth target surface (e.g., glass), and/or an insulating target surface. An electroadhesion device 100 generating a high voltage output may generate sparks, fires, electric shock, and other safety hazards when placed into contract with—and/or in close proximity to—conductive surfaces. To avoid safety hazards, some embodiments of the electroadhesion device 100 may not generate a high voltage and may only generate an output adjustable voltage sufficient to attach the electroadhesion device 100 to conductive target surfaces, organic target surfaces, and the like.

When the electroadhesion device 100 is moved to a new target surface, the sensor 114 may automatically detect one or more characteristics of the new target surface and/or determine the material type, surface texture, surface morphology, or other characteristic for the new target surface. The digital switch 116 may then modify and/or maintain the adjustable voltage output generated by the voltage converter 108 based on the material type and/or characteristics for the new target surface. To determine the adjustable voltage to generate using the voltage converter 108, the digital switch 116 may include logic for determining the adjustable voltage based on sensor data received from the sensor 114. For example, the digital switch 116 may include logic for using a look up table to determine the proper adjustable voltage based on the sensor data. The logic incorporated into the digital switch 116 may also include one or more algorithms for calculating the proper adjustable voltage based on the sensor data. Additionally, if the sensor 114 detects the electroadhesion device 100 is moved away from a target surface, the digital switch 116 may power down the voltage converter 108 and/or otherwise terminate the adjustable voltage output from the voltage converter 108 until a new target surface is detected by the sensor 114.

The one or more sensors 114 can include a wide variety of sensors 114 for measuring characteristics of the target surface. Each sensor 114 may be operated by a sensor control circuit 118. The sensor control circuit 118 may be included in the sensor 114 or may be a distinct component. The sensor control circuit 118 can be a microcontroller or other integrated circuit having programmable logic for controlling the sensor 114. For example, the sensor control circuit 118 may initiate capture of sensor data, cease capture of sensor data, set the sample rate for the sensor, control transmission of sensor data measured by the sensor 114, and the like. Sensors 114 can include conductivity sensors (e.g., electrode conductivity sensors, induction conductivity sensors, and the like); Hall effect sensors and other magnetic field sensors; porosity sensors (e.g., time domain reflectometry (TDR) porosity sensors); wave form sensors (e.g., ultrasound sensors, radar sensors, infrared sensors, dot field projection depth sensors, time of flight depth sensors); motion sensors; surface texture sensors; surface profile sensors, surface morphology sensors, and the like. Sensor data measured by the one or more sensors 114 may be used to determine one or more characteristics of the target surface. For example, sensor data may be used to determine the target surface's conductivity and other electrical or magnetic characteristics; the material's porosity, permeability, and surface morphology; the materials hardness, smoothness, surface profile, and other surface characteristics; the distance the target surface is from the sensor; and the like. One or more characteristics determined from sensor data may be used to control the digital switch 116 directly. Sensor data may also be sent to a data analysis module 422 shown in FIG. 4. The data analysis module 422 may refine the sensor data and use it to determine a characteristic and/or material type (e.g., metal, wood, plastic, ceramic, concreate, drywall, glass, stone and the like) for the target surface. The digital switch 116 may then control the voltage output from the voltage converter 108 based on the characteristic and/or material type for the target surface determined by the data analysis module 422.

The digital switch 116 may function as an essential safety feature of the electroadhesion device 100. The digital switch 116 may reduce the risk of sparks, fires, electric shock, and other safety hazards that may result from applying a high voltage to a conductive target surface. By autonomously controlling the voltage generated by the electroadhesion device 100, the digital switch 116 may also minimize human error that may result when a user manually sets the voltage output of the electroadhesion device 100. For example, human errors may include a user forgetting to change the voltage setting, a child playing with the electroadhesion device and not paying attention to the voltage setting, a user mistaking a conductive surface for an insulating surface, and the like. These errors may be eliminated by using digital switch 116 to automatically adjust the voltage generated by the voltage converter 108 based on sensor data received from the one or more sensors 114 and/or material classifications made by the data analysis module 422.

As shown in FIG. 2, to promote safely and improve user experience, the electroadhesion device 100 and/or a device 200 integrated with the electroadhesion device 100 may include a mechanism (e.g., button, mechanical switch, UI element, and the like) for actuating the sensor 114 and/or digital switch 116. The sensor 114 and digital switch 116 may also be automatically turned on when the electroadhesion device 100 and/or device 200 is powered on. The electroadhesion device 100 and/or device 200 may also include a signaling mechanism (e.g., status light, UI element, mechanical switch, and the like) for communicating the status of the sensor 114 and/or digital switch 116 to a user of the electroadhesion device 100. The signaling mechanism may be used to communicate that the proper adjustable voltage for a particular target surface has been determined.

In various embodiments, the signaling mechanism may be a status light that is red when the sensor 114 and/or digital switch 116 is powered on and sensing the target surface material or other characteristics but has not determined the proper adjustable voltage for the target surface. The status light may turn green when the digital switch 116 has received the sensor data, determined the appropriate adjustable voltage for the particular target surface, and generated the proper adjustable voltage output and the electroadhesion device 100 is ready to attach to the target surface. The status light may also turn blinking red and/or yellow if there is some problem with determining the adjustable voltage for the particular target surface and/or generating the adjustable voltage output for the particular target surface. For example, the status light may blink red and/or turn yellow when the sensor 114 is unable to collect sensor data, the data analysis module 422 is unable to determine a material type or other characteristic for the target surface material, the digital switch 116 is unable to operate the voltage converter 108, the voltage converter 108 is unable to generate the correct adjustable voltage, and the like.

As described herein, voltage generated by the voltage converter 108 is defined as a range of DC voltage of any one or more of the following from 250 V to 10,000 V; from 500 V to 10,000 V; from 1,000 V to 10,000 V; from 1,500 V to 10,000 V; from 2,000 V to 10,000 V; from 3,000 V to 10,000 V; from 4,000 V to 10,000 V; from 5,000 V to 10,000 V; from 6,000 V to 10,000 V; from 7,000 V to 10,000 V; from 250 V to 1,000 V; from 250 V to 2,000 V; from 250 V to 4,000 V; from 500 V to 1,000 V; from 500 V to 2,000 V; from 500 V to 4,000 V; from 1,000 V to 2,000 V; from 1,000 V to 4,000 V; from 1,000 V to 6,000 V; from 2,000 V to 4,000 V; from 2,000 V to 6,000 V; from 4,000 V to 6,000 V; from 4,000 V to 10,000 V; from 6,000 V to 8,000 V; and from 8,000 V to 10,000 V.

As described herein, voltage generated by the voltage converter 108 is defined as a range of AC voltage of any one or more of the following from 250 $V_{rms}$ to 10,000 $V_{rms}$; from 500 $V_{rms}$ to 10,000 $V_{rms}$; from 1,000 $V_{rms}$ to 10,000 $V_{rms}$; from 1,500 V to 10,000 $V_{rms}$; from 2,000 $V_{rms}$ to 10,000 $V_{rms}$; from 3,000 $V_{rms}$ to 10,000 $V_{rms}$; from 4,000 $V_{rms}$ to 10,000 $V_{rms}$; from 5,000 $V_{rms}$ to 10,000 $V_{rms}$; from 6,000 $V_{rms}$ to 8,000 $V_{rms}$; from 7,000 $V_{rms}$ to 8,000 $V_{rms}$; from 8,000 $V_{rms}$ to 10,000 $V_{rms}$; from 9,000 $V_{rms}$ to 10,000 $V_{rms}$; from 250 $V_{rms}$ to 1,000 $V_{rms}$; from 250 $V_{rms}$ to 2,000 $V_{rms}$; from 250 $V_{rms}$ to 4,000 $V_{rms}$; from 500 $V_{rms}$ to 1,000 $V_{rms}$; from 500 $V_{rms}$ to 2,000 $V_{rms}$; from 500 $V_{rms}$ to 4,000 $V_{rms}$; from 1,000 V to 2,000 $V_{rms}$; from 1,000 $V_{rms}$ to 4,000 $V_{rms}$; from 1,000 $V_{rms}$ to 6,000 $V_{rms}$; from 2,000 $V_{rms}$ to 4,000 $V_{rms}$; from 2,000 V to 6,000 $V_{rms}$; from 4,000 $V_{rms}$ to 6,000 $V_{rms}$; from 4,000 $V_{rms}$ to 8,000 $V_{rms}$; and from 6,000 $V_{rms}$ to 8,000 $V_{rms}$.

As described herein, voltage generated by the voltage converter 108 is defined as a range of DC voltage of any one or more of the following from about 250 V to about 10,000 V; from about 500 V to about 10,000 V; from about 1,000 V to about 10,000 V; from about 1,500 V to about 10,000 V; from about 2,000 V to about 10,000 V; from about 3,000 V to about 10,000 V; from about 4,000 V to about 10,000 V; from about 5,000 V to about 10,000 V; from about 6,000 V to about 8,000 V; from about 7,000 V to about 8,000 V; from about 250 V to about 1,000 V; from about 250 V to about 2,000 V; from about 250 V to about 4,000 V; from about 500 V to about 1,000 V; from about 500 V to about 2,000 V; from about 500 V to about 4,000 V; from about 1,000 V to about 2,000 V; from about 1,000 V to about 4,000 V; from about 1,000 V to about 6,000 V; from about 2,000 V to about 4,000 V; from about 2,000 V to about 6,000 V; from about 4,000 V to about 6,000 V; from about 4,000 V to about 8,000 V; from about 6,000 V to about 8,000 V; from about 8,000 V to about 10,000 V; and from about 9,000 V to about 10,000 V.

As described herein, voltage generated by the voltage converter 108 is defined as a range of AC voltage of any one or more of the following from about 250 $V_{rms}$ to about 10,000 $V_{rms}$; from about 500 $V_{rms}$ to about 10,000 $V_{rms}$; from about 1,000 $V_{rms}$ to about 10,000 $V_{rms}$ r; from about 1,500 $V_{rms}$ to about 10,000 $V_{rms}$; from about 2,000 $V_{rms}$ to about 10,000 $V_{rms}$ r; from about 3,000 $V_{rms}$ to about 10,000 $V_{rms}$; from about 4,000 $V_{rms}$ to about 10,000 $V_{rms}$; from about 5,000 $V_{rms}$ to about 10,000 $V_{rms}$; from about 6,000 $V_{rms}$ to about 8,000 $V_{rms}$; from about 7,000 V to about 8,000 $V_{rms}$; from about 250 $V_{rms}$ to about 1,000 $V_{rms}$; from about 250 $V_{rms}$ to about 2,000 $V_{rms}$; from about 250 $V_{rms}$ to about 4,000 $V_{rms}$; from about 500 $V_{rms}$ to about 1,000 $V_{rms}$; from about 500 $V_{rms}$ to about 2,000 $V_{rms}$; from about 500 $V_{rms}$ to about 4,000 $V_{rms}$; from about 1,000 $V_{rms}$ to about 2,000 $V_{rms}$; from about 1,000 V to about 4,000 $V_{rms}$; from about 1,000 V to about 6,000 $V_{rms}$; from about 2,000 $V_{rms}$ to about 4,000 $V_{rms}$; from about 2,000 $V_{rms}$ to about 6,000 $V_{rms}$; from about 4,000 $V_{rms}$ to about 6,000 $V_{rms}$; from about 4,000 $V_{rms}$ to about 8,000 $V_{rms}$; from about 6,000 $V_{rms}$ to about 8,000 $V_{rms}$; from about 8,000 $V_{rms}$ to about 10,000 $V_{rms}$; and from about 9,000 $V_{rms}$ to about 10,000 $V_{rms}$.

As described herein, voltage output from the power supply 112 is defined as a range of DC voltage of any one or more of the following from 2.0 V to 249.99 V; from 2.0 V to 150.0 V; from 2.0 V to 100.0 V; from 2.0 V to 50.0 V; from 5.0 V to 249.99 V; from 5.0 V to 150.0V; from 5.0V to 100.0 V; from 5.0 V to 50.0 V; from 50.0 V to 150.0 V; from 100.0 V to 249.99 V; from 100.0 V to 130.0 V; and from 10.0 V and 30.0 V.

As described herein, voltage output from the power supply 112 is defined as a range of AC voltage of any one or more of the following from 2.0 $V_{rms}$ to 249.99 $V_{rms}$; from 2.0 $V_{rms}$ to 150.0 $V_{rms}$; from 2.0 $V_{rms}$ to 100.0 $V_{rms}$; from 2.0 $V_{rms}$ to 50.0 $V_{rms}$; from 5.0 $V_{rms}$ to 249.99 $V_{rms}$; from 5.0 $V_{rms}$ to 150.0 $V_{rms}$; from 5.0 $V_{rms}$ to 100.0 $V_{rms}$; from 5.0 $V_{rms}$ to 50.0 $V_{rms}$; from 50.0 $V_{rms}$ to 150.0 $V_{rms}$; from 100.0 $V_{rms}$ to 249.99 $V_{rms}$; from 100.0 $V_{rms}$ to 130.0 $V_{rms}$; and from 10.0 $V_{rms}$ and 30.0 $V_{rms}$.

As described herein, voltage output from the power supply 112 is defined as a range of DC voltage of any one or more of the following from about 2.0 V to about 249.99 V; from about 2.0 V to about 150.0 V; from about 2.0 V to about 100.0 V; from about 2.0 V to about 50.0 V; from about 5.0 V to about 249.99 V; from about 5.0 V to about 150.0 V; from about 5.0 V to about 100.0 V; from about 5.0 V to about 50.0 V; from about 50.0 V to about 150.0 V; from about 100.0 V to about 249.99 V; from about 100.0 V to about 130.0 V; and from about 10.0 V and 30.0 V.

As described herein, voltage output from the power supply 112 is defined as a range of AC voltage of any one or more of the following from about 2.0 $V_{rms}$ to about 249.99 $V_{rms}$; from about 2.0 $V_{rms}$ to about 150.0 $V_{rms}$; from about 2.0 $V_{rms}$ to about 100.0 $V_{rms}$; from about 2.0 V to about 50.0 $V_{rms}$; from about 5.0 $V_{rms}$ to about 249.99 $V_{rms}$; from about 5.0 $V_{rms}$ to about 150.0 $V_{rms}$; from about 5.0 $V_{rms}$ to about 100.0 $V_{rms}$; from about 5.0 $V_{rms}$ to about 50.0 $V_{rms}$; from about 50.0 $V_{rms}$ to about 150.0 $V_{rms}$; from about 100.0 $V_{rms}$ to about 249.99 $V_{rms}$; from about 100.0 $V_{rms}$ to about 130.0 $V_{rms}$; and from about 10.0 $V_{rms}$ and 30.0 $V_{rms}$.

FIG. 2 illustrates a device 200 having an electroadhesion device 100 holder. In various embodiments, the electroadhesion device 100 may be used to mount the device 200 to the surface of a foreign object 210 or other target surface including walls, mirrors, trees, furniture, and the like. FIG. 2 shows a side view of a device 200 mounted to a foreign object 210 using the electroadhesion device 100. The electroadhesion device 100 may include one or more sensors 114 for measuring one or more characteristics of the foreign object 210.

To attach the device 200 to the foreign object 210, the one or more sensors 114 determines a characteristic of the foreign object 210. Based on the sensor data, the electroadhesion device 100 applies an adjustable voltage to one or more electrodes 104, the adjustable voltage induces a local electric field 220 around the one or more electrodes 104 wherein opposite charges from the inner portion 212 of the foreign object 210 build up around the surface of the electrodes 104. The build-up of opposing charges creates an electroadhesive force between the electroadhesion device 100 attached to the device 200 and the foreign object 210. The electroadhesive force is sufficient to fix the device 200 to the target surface 214 of the foreign object 210 while the adjustable voltage is applied. It should be understood that the electroadhesion device 100 does not have to be in direct content with the target surface 214 of the foreign object 210 to produce the electroadhesive force. Instead, the target surface 214 of the foreign object 210 must be proximate to the electroadhesion device 100 to interact with the adjustable voltage on the one or more electrodes 104. The electroadhesion device 100 may, therefore, secure the device 200 to smooth, even surfaces as well as rough, uneven surfaces. Additionally, the portion of the electroadhesion device 100 including the one or more electrodes may be curved, flat, and or have an adjustable surface to facilitate better contact with the target surface 214.

Figure 3:
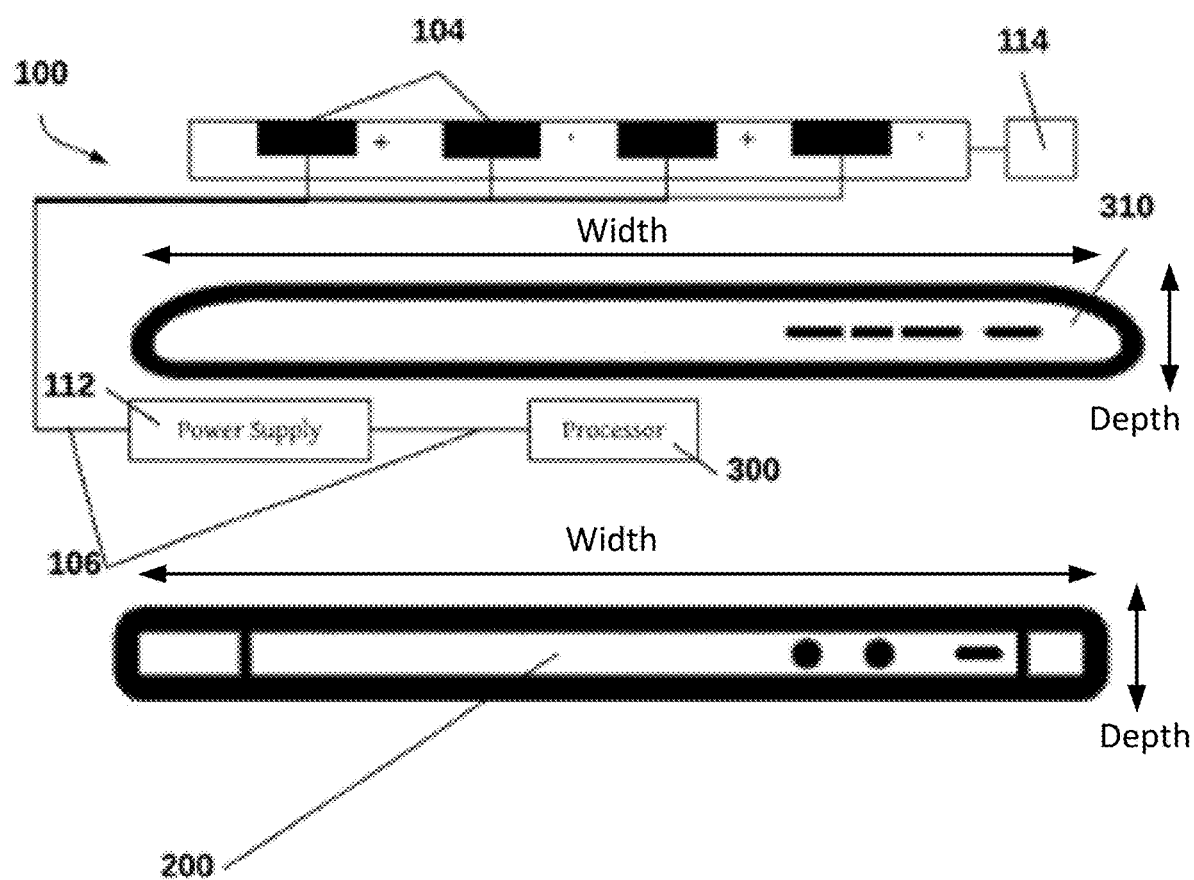
FIG. 3 illustrates an exploded view of an electroadhesion device holder integrated into a case.

FIG. 3 illustrates an exemplary electroadhesion device 100 integrated into a case 310. When fixed to a device 200 the case 310 functions as a device holder that may secure the device 200 to foreign objects using the electroadhesion device 100. To activate and de-activate the electroadhesion device 100, one or more electrical connections 106 may transfer electrical signals from the processor 300 to the power supply 112. The electrical signals may indicate the adjustable voltage to apply to the one or more electrodes 104. The adjustable voltage indicated by the electrical signal may depend on one or more characteristics of the foreign object 210 measured by the one or more sensors 114. The processor 300 may execute one or more functions of the voltage converter to convent a low voltage current into a high voltage current in order to create an electroadhesion voltage at the one or more electrodes 104. The case 310 may be any known device case including a smartphone protective case, tablet protective case, camera protective case, and the like. The case 310 may attach to a device by any known method including, for example, stretching over the edges of the device 200 and retracting to securely cover the device 200.

Figure 4:
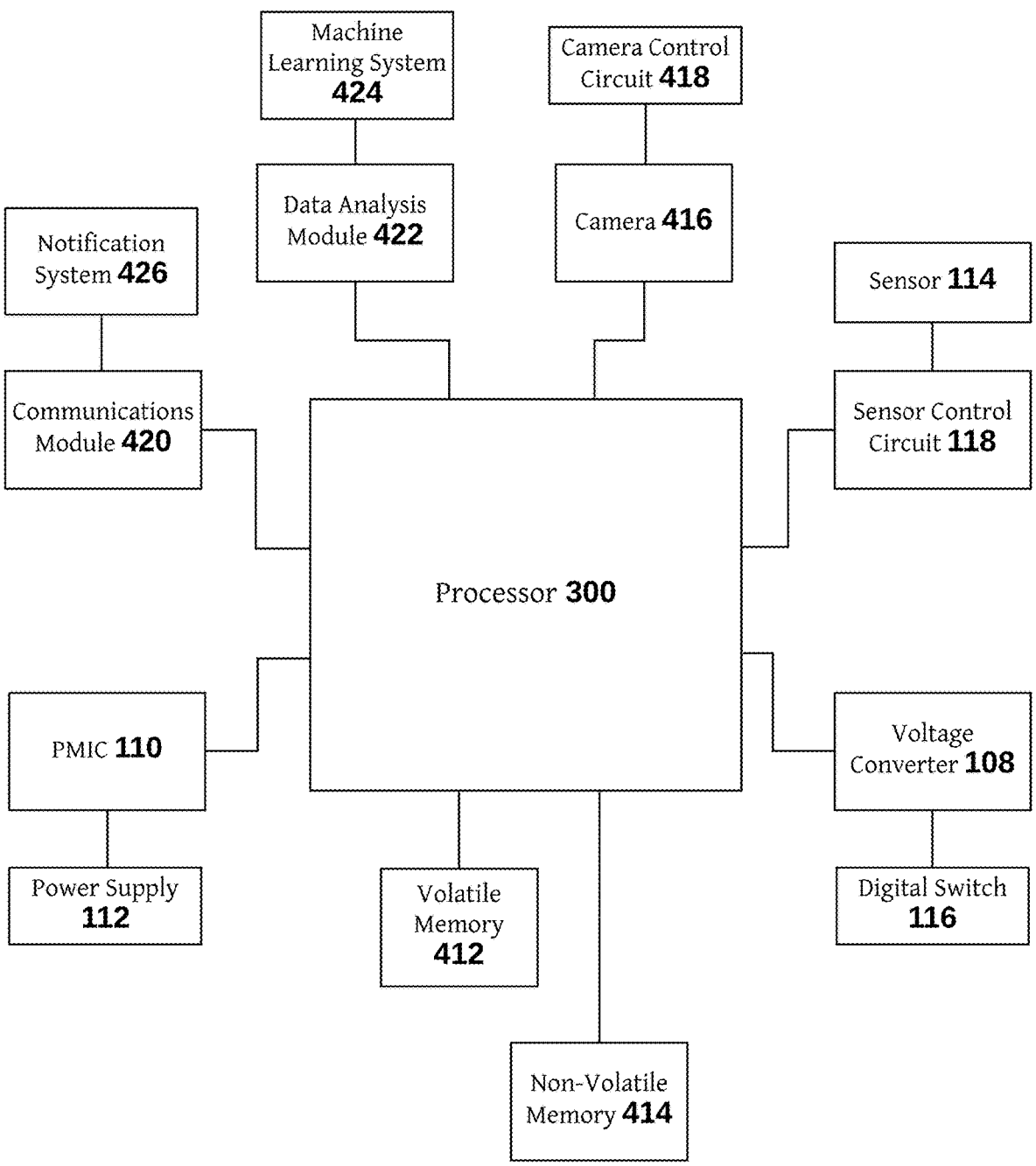
FIG. 4 illustrates an exemplary processor included in the electroadhesion device holder of FIG. 4.

FIG. 4 illustrates an exemplary board 400 for mounting one or more components of the electroadhesion device 100. The board 400 may be any known board containing one more electric circuits, for example, a circuit board, printed circuit board, and the like. The board 400 may include a processor 300 for executing commands and instructions of one or more of the components. Suitable processors 300 for the execution of a program of instructions may include, by way of example, both general and special purpose microcontrollers or microprocessors, and the sole processor or one of multiple processors or cores, of any kind of computer. Generally, a processor 300 may receive instructions and data from a volatile memory 412 or a non-volatile memory 414 or both. Suitable volatile memory 412 may include RAM, high speed memory, double data rate memory, 4R memory, and the like. Suitable non-volatile memory 414 may include embedded MMC or eMMC, solid-state drive or SSD, and the like.

To convert voltage from the power supply 112 current to an adjustable voltage output for electroadhesion, the processor 300 may execute instructions on a voltage converter 108. Operation of the voltage converter 108 may be controlled by a digital switch 116. By dictating the strength of the adjustable voltage output by the voltage converter 108, the digital switch 116 may be used to control the adjustable voltage output of the electroadhesion device 100. In various embodiments, the digital switch 116 may be used to adjust the strength of the adjustable voltage output generated by the voltage converter 108 based on the type of material and or other characteristic of the foreign object and or other target surface interfacing with the electroadhesion device 100.

A combination of one or more sensors 114 may be used to determine the type of material and or other characteristic of the foreign object and or other target surface interfacing with the electroadhesion device 100. The sensor 114 may be a conductivity sensor that measures the conductivity of a material interfacing with the electroadhesion device 110. The conductivity sensor may include one or more electrodes for measuring conductivity. To measure conductivity using the one or more electrodes, the electrodes are placed in contact with the foreign object or other target surface. A voltage is then applied at one of the electrodes to generate a current. A second electrode is then used to measure the current flowing through the target surface material. The greater the current measured at the second electrode, the greater the conductivity of the target surface material. The conductivity sensor may also include a contactless sensor (i.e., an induction conductivity sensor) that measures conductivity using two or more toroidal coils. To measure conductivity, one coil emits an electric field in the direction of the target surface. A second coil measures the magnitude of a small electric current induced by the electric field emitted by the first coil. The strength of the induced electric current is proportional to the number of ions present in the target surface material.

Other sensors 114 may include Hall effect sensors or other magnetic field sensors that can determine the electric characteristics of the target surface material based on the material's magnetic characteristics. Porosity sensors may also be used to determine surface characteristics of the target surface material. Porosity sensors may apply time domain reflectometry (TDR) to measure moisture transport in unsaturated porous materials. TDR based porosity sensors may emit a wave pulse or other signal into a target surface material. The TDR porosity sensor then detects the reflected signal that bounces back from the target surface material and determines porosity and moisture content based on an analysis of the reflected waveform. Sensors 114 may also include ultrasound sensors, radar sensors, infrared sensors, dot field projection depth sensors, time of flight depth sensors, and other wave form based sensors for detecting characteristics of the target surface material.

A sensor control circuit 118 may be used to control one or more aspects of the one or more sensors 114. For example, the sensor control circuit 118 may control the sample rate of the sensor 114, the amount of voltage applied to the electrodes or coils of a conductivity sensor, the strength of a signal emitted by TDR porosity sensor, and the like. The sensor control circuit 118 may include logic for ensuring a high sampling rate for sensor data measurements. For example, sampling rates of 0.1-5 seconds may be used to obtain sufficient data to accurately determine characteristics of the target surface in the time it takes the user to move the electroadhesion device 100 into contact with a wall, door, mirror, or other target surface. The processor 300 may facilitate communications between one or more sensors 114 to compensate the measurements made by one sensor based on the sensor data collected by a second sensor. For example, the conductivity of a material may depend on the temperature of the material. Therefore, temperature data collected by a temperature sensor may be used to adjust the conductivity measurements obtained by a conductivity sensor. To improve the accuracy and reliability of sensor data, the sensor control circuit 118 may also include logic that controls transmission of sensor data to the communications module 420 and/or data analysis module 422. For example, the sensor control circuit 118 may ensure sensor data does not contain errors and is collected by a properly functioning sensor before the data is provided to the data analysis module 422 or used to control operation of the digital switch 116.

Measurements and other sensor data captured by the one or more sensors 114 may be transmitted to the data analysis module 422. The data analysis module 422 may perform one or more operations to refine sensor data. For example, the data analysis module 422 may organize and improve the quality of sensor data by time stamping sensor data points, averaging a series of sensor measurements, converting the sensor data to another form or unit, and/or performing other statistical operations to remove outliners, reduce variation, minimize error, and the like. The data analysis module 422 may also analyze sensor data using any known technique, for example, statistical, algorithmic and/or heuristic analysis, to determine the type of target surface material.

Once the type of surface material is determined, the digital switch 116 may operate the voltage converter 108 to generate a voltage that is sufficient the attach the electroadhesion device 100 to the target surface. The digital switch 116 may dynamically adjust the voltage output by the voltage converter 108 based on the target surface material to ensure safe operation of the electroadhesion device 100. The voltage required to attach the electroadhesion device 100 to a target surface depends on the characteristics of the target surface material, for example, the material's conductivity and other electrical or magnetic characteristics, the material's porosity, surface morphology, surface texture, surface profile, and other surface characteristics, and the like.

In various embodiments, outputs from one or more sensors 114 may be combined with image data captured by one or more cameras 416. The combination of sensor data and image data may be used to determine the material type and or other characteristics of a target surface material and/or validate a user of the electroadhesion device 100. The camera 416 may be included in the electroadhesion device 100 or a device 200 integrated with the electroadhesion device 100. A camera control circuit 418 may operate the camera 416 to capture image data including images of the target surface material and a user of the electroadhesion device 100. The camera control circuit 418 may be included in the camera 416 or may be a separate component of the electroadhesion device 100.

To determine the material type and or other characteristics of the target surface material, sensor data from the one or more sensors 114 and image data from the camera 416 may be transmitted to the data analysis module 422. The data analysis module 422 may include a machine learning system 424 that performs one or more image classification tasks. For example, the machine learning system 424 may generate a material prediction that predicts the type of material for the target surface. The machine learning system 424 may also generate a user prediction that predicts whether the user of the electroadhesion device 100 is an authorized user. The machine learning system 424 may include a data processing pipeline and a classification engine. The data processing pipeline may prepare training data including image data and sensor data for training one or more machine learning models. The classification engine may generate one or more machine learning models by processing training data using one or more machine learning algorithms and/or a neural network or other deep learning system.

To generate a material classification model that predicts the material type for a target surface, the machine learning system 424 may process training data including a plurality of images of different materials using a convolutional neutral network (CNN). The CNN may train a material classification model by extracting features from images included in the training data using one or more convolutional layers. Outputs from the convolutional layers may then be fed into one or more classification layers (e.g., fully connected layers), for example, a feed forward layer, de-convolution layer, max pooling layer, and the like, to generate a material prediction based on the features extracted by the convolutional layers.

During training, the convolutional layers may extract features from images in the training data. The trainable parameters of the classification layers may be initialized and updated to maximize model performance. Model performance may be approximated as the error for an objective function of a training task. Training tasks may include image classification tasks for example, classifying images with wood materials, classifying images with conductive materials, and the like. To improve model performance and minimize error for one or more training tasks, one or more training cycles may be repeated using updated hyperparameters, features and or model parameters. Post training, the extracted feature sets and trained weights and or other parameters included in a material classification model selected for deployment (e.g., a material classification model with a classification accuracy of at least 90%) are saved in a model file that may be inferenced by the data analysis module 422 to generate a material type prediction.

To improve the accuracy of material type predictions, the machine learning system 424 may incorporate data from one or more sensors 114. The data processing pipeline may incorporate sensor data into training datasets used by the classification engine to generate predictions. For example, sensor data including depth measurements, conductivity values, wave intensities, and the like collected by sensors including an infrared sensor, time of flight depth sensor, conductivity sensor, and the like may be processed by the classification engine. One or more machine learning algorithms and/or neural network layers may extract features from the sensor data. The sensor data features may then be added to the material classification model and used to make more accurate predictions. Additionally, the classification engine may generate a separate material classification model using sensor data. The classification engine may then ensemble the sensor data material classification model with the image data material classification model to generate a material type prediction.

The machine learning system 424 may also generate a user validation model that predicts whether the user of the electroadhesion device 100 is an authorized user. To generate the user validation model, the machine learning system 424 may process training data including a plurality of images of people, animals, and objects using a convolutional neutral network (CNN). The CNN may train a user validation model by extracting features from images included in the training data using one or more convolutional layers. Outputs from the convolutional layers may then be fed into one or more classification layers, for example, a feed forward layer, de-convolution layer, and the like, to generate a user prediction based on the features extracted by the convolutional layers.

The user validation model may be an additional safety feature of the electroadhesion device 100. For example, the user validation model may be trained to recognize one or more images of authorized users of the electroadhesion device 100 that are included in training data. When the electroadhesion device 100 is turned on or actuated, a camera 416 may automatically capture an image of the user. The image may then be classified using the user validation model to generate a user prediction. The electroadhesion device 100 may also validate users using a face scan app (e.g., IOS Face Scan) or other facial scanning technology built-in to a smart phone or other device 200 integrated with the electroadhesion device 100. If a non-authorized user, for example, a small child, attempts to use the electroadhesion device 100, the user validation model may generate a user prediction that classifies the child as a non-authorized user. In response, to receiving the non-authorized user prediction, the data analysis module 422 may cause the digital switch 116 to power down the voltage converter 108. Powering down the voltage converter 108 prevents the electroadhesion device 100 from generating voltage and ensures an unsupervised child or others will not be harmed by the adjustable voltage generated by the electroadhesion device 100.

The user validation model may also prevent accidental use of the electroadhesion device 100. If the electroadhesion device 100 is actuated by accident, the image data captured by the camera 416 will not be of the user's face. Instead, the image data may capture the user's arm, the inside of a bag or pocket, the user's pet, and like. The image data is then sent to the user validation model to generate a user prediction. Since the user's face is not included in the image data, the user validation model will generate a user prediction that classifies the image data as a non-authorized user. In response, the data analysis module 422 may cause the digital switch 116 to power down the voltage converter 108 and thereby prevent the electroadhesion device 100 from generating an adjustable voltage. By automatically powering down the voltage converter 108 in response to detecting an unauthorized user, the user validation model avoids hazards and dangerous situations that can arise from accidental or unintentional generation of the adjustable voltage. The user validation model may also function as security feature that allows only authorized users to use the electroadhesion device 100.

The processor 300 may be coupled to a communications module 420 to facilitate communicating with external devices. The communication module 420 can include a wireless communications module for transmitting data and/or messages to an external device (e.g., a laptop, smartwatch, an external hard drive, a tablet, a smartphone, and the like). For example, the communications module 420 may connect to a device 200 through a wired and/or wireless connection path to enable control of the electroadhesion device 100 using the device 200. The wireless communications module may include a Wi-Fi chip, an embedded Bluetooth module, and the like. The communications module 420 may transmit data using any known wired or wireless communications protocol, for example, Bluetooth, Wi-Fi, and the like. To facilitate faster communications, the communications module 420 may have multiple pins for connecting multiple parts of the sensor control circuit 118, digital switch 116, camera control circuit 418, and/or data analysis module 422.

The communications module 420 may include a notification system 426. The notification system 426 may connect to a device 200 attached to the electroadhesion device 100 and/or a remote device (e.g. a smartwatch, smartphone, computer, or other consumer device not attached to the electroadhesion device 100) via the communications module 420. The notification system 426 may alert the user to prevent the user from forgetting the electroadhesion device 100 and/or a consumer device 200 secured to a target surface using the electroadhesion device 100. The notification system 426 may include programmable logic that may integrate with a device 200 and/or a remote device to send a notification (e.g., email message, push notification, and the like) to the device 200 and/or remote device after electroadhesion device 100 has been turned on for a set amount of time. For example, the notification system 426 may send a notification if the electroadhesion device 100 has been turned on for 3 minutes, 5 minutes, 10 minutes or any other time period set by the user. The notification system 426 may integrate with a GPS module, mapping application, or other location system of the device 200 and/or electroadhesion device 100 to include to location information (e.g., current geolocation) for the electroadhesion device 100 in the notification.

The notification system 426 may also send a notification to a device 200 and/or remote device if the electroadhesion device 100 is no longer able to establish a connection with the device 200. For example, the device 200 may be connected to an electroadhesion device 100 via a Bluetooth and/or Wifi connection. If the device 200 is no longer able to connect with the electroadhesion device 100 and/or the device 200 is moved to the outer limit of the connection range, the notification system 426 may send a notification to a device 200 and/or remote device. The notification may indicate the connection between the electroadhesion device 100 and the device 200 is lost and/or weak and provide the geolocation of the electroadhesion device 100 and/or device 200. The notification system 426 may also provide one or more electronic and/or mechanical notifications. For example, the notification system 426 may be programmed to make a beeping sound or other audio notification and/or generate a flashing light or other visible notification if the electroadhesion device 100 has been left on for a set amount of time and/or is no longer able to establish a connection with the device 200.

To control charging and withdrawing power from the power supply 112, the processor 300 may execute instructions on a power management integrated circuit (PIMC) 110. The board 400 may include built-in LiPoly charger that interfaces with a USB controller to charge the power supply 112 by plugging a wall charger into a USB port coupled to the processor 300. The power supply 112 supplies electrical energy for running the electrical components of the electroadhesion device 100. To prolong the amount of time the electroadhesion device 100 may be used without recharging the power supply 112, the PMIC 110 may regulate power to one or more components. For example, the PMIC 110 may only power the processor 300 and volatile memory 412 when the electroadhesion device 100 is not in use. The PMIC 110 may also power down one or more components of the electroadhesion device 100 when they are not in use. For example, the PMIC 110 may power down the camera 416 and the camera control circuit 418 after the user of the electroadhesion device 100 is validated, the sensor 114 and the sensor control circuit 118 when the electroadhesion device 100 is securely attached to a target surface, and the like.

Figure 5:
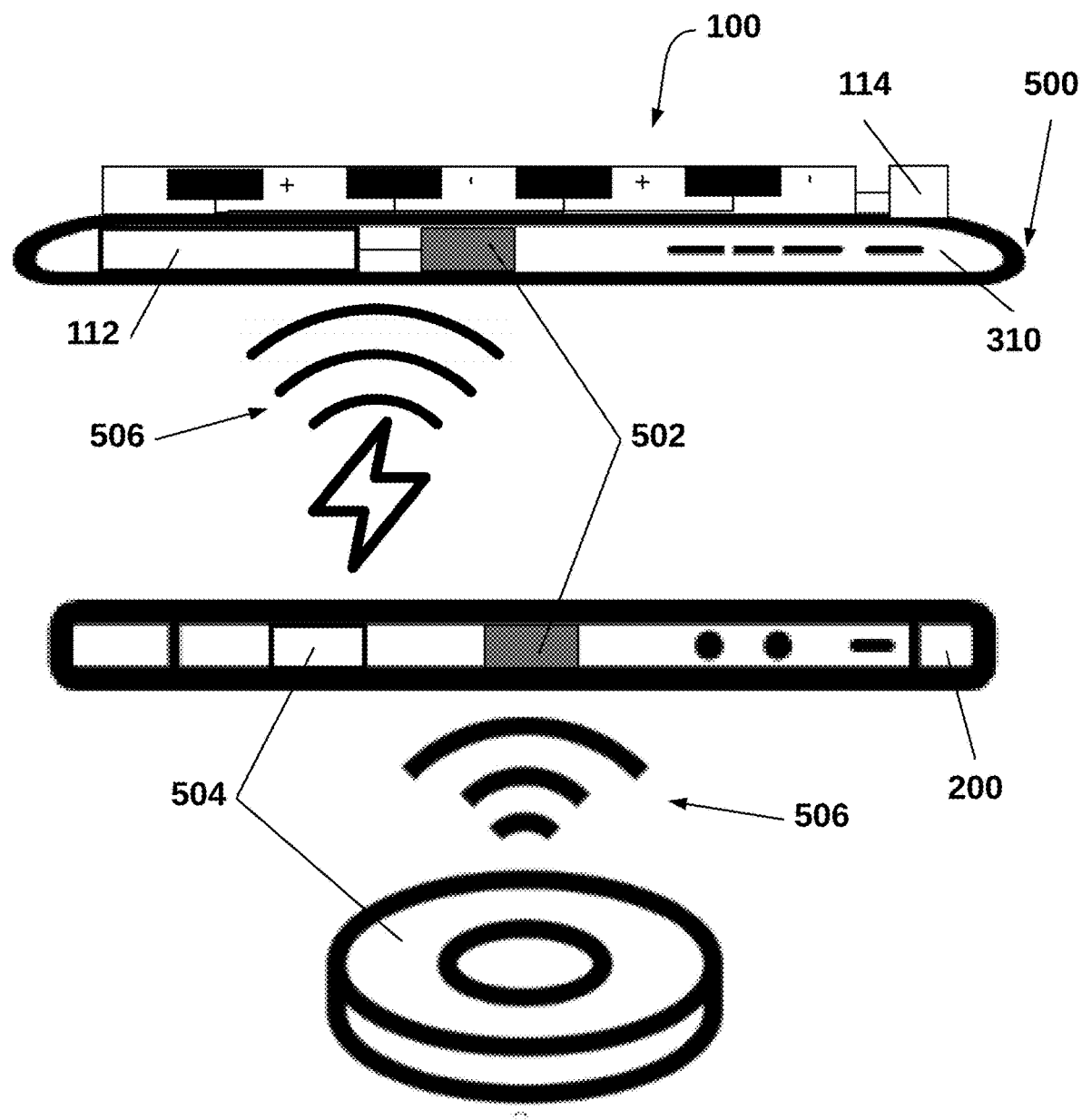
FIG. 5 illustrates an exemplary wireless charging embodiment of the electroadhesion device holder of FIG. 3.

FIG. 5 illustrates an exemplary wireless charging embodiment of the electroadhesion device holder 500. As shown the electroadhesion device holder 500 may include an integrated electroadhesion device 100 include one or more sensors 114. To wirelessly charge a power supply 112 built into a case 310, a charge receiving coil 502 built into the case 310 receives a wireless charging signal 506 (e.g., alternating electromagnetic filed or other known wireless charging signal) from an induction coil 504 included in a device 200. The charge receiving coil 502 then converts the wireless charging signal 506 into electricity that it feeds to the power supply 112 to charge the power supply 112. Charging the power supply 112 of the electroadhesion device 100 may eliminate the need for a wired connection between the device 200 and the electroadhesion device holder 500. Including a charge receiving coil 502 in an electroadhesion device holder 500 for a device having an induction coil 504 for wireless charging may also eliminate the need to the device holder to have a communications interface (e.g., USB charging port, micro USB charging port and the like) to support wired charging of the electroadhesion device holder 500. As shown in FIG. 5, the device 200 may also include a charge receiving coil 502 for receiving a wireless charging signal 506 for a wireless charging device including an induction coil 506. Therefore, the power supply of the device 200 may be wirelessly charged to provide power to an induction coil 502 included in the device 200 the provides a wireless charging signal 506 to a receiving coil 502 in an electroadhesion device holder 500 in order to wirelessly charge the power supply 112 included in the electroadhesion device holder 500.

Figure 6A:
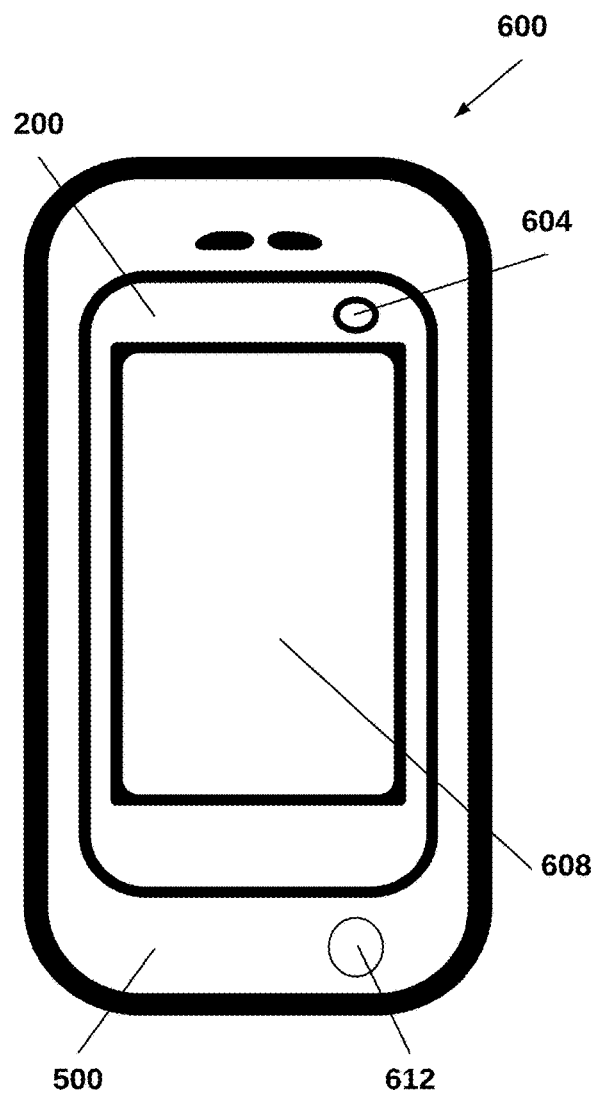
FIGS. 6A-B is an alternative perspective of the electroadhesion device holder of FIG. 3.
Figure 6B:
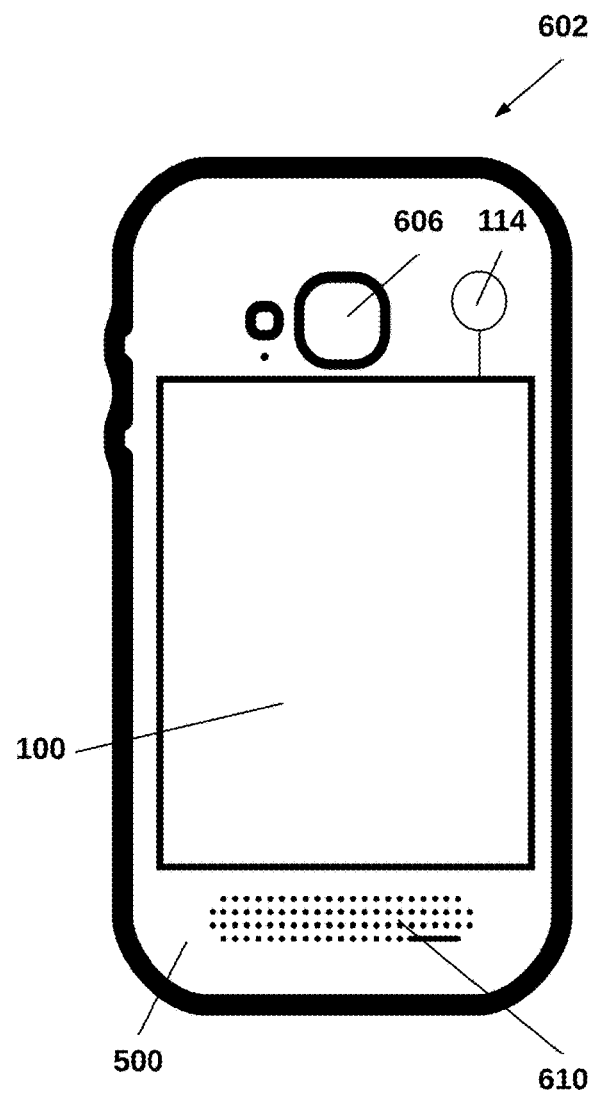

FIG. 6A-B illustrate a flat front view 600 and flat back view 602 of an exemplary electroadhesion device holder 500. As shown in FIG. 6A, the electroadhesion device holder 500 may be implemented as a case holding a device 200. In various embodiments, the device may include a front camera 604 and a screen 608 for viewing content. The electroadhesion device 100 may be integrated into the back portion of the electroadhesion device holder 500 as shown in FIG. 6B. This orientation allows the device 200 to be attached to foreign object using the electroadhesion device 100 with a visible screen 200 and the functional front camera 604. To maximize the surface area of the attachment surface, the electroadhesion device 100 may cover most of the back portion of the electroadhesion device holder 500. In various embodiments, the electroadhesion device 100 may cover the entire back portion of the electroadhesion device holder 500 except areas including a rear camera and/or a hole 606 for letting light pass through to a rear camera 606 and/or speakers/microphones 610 or holes for letting sound pass out from speakers and/or pass through to microphones.

One or more sensors 114 may be attached to the electroadhesion device 100 and a button 612, latch, or other mechanism for actuating the electroadhesion device 100 and/or adjusting the voltage output. The button 612, latch, or other mechanism may be attached to the front of the electroadhesion device holder 500. In various embodiments, a removable cover may be placed over the button 612, latch, or other mechanism. The removable cover may be used to prevent accidentally generating and/or adjusting the voltage output. The removable cover may be used as a safety mechanism in combination with—or in place of—the sensor and digital switch.

Figure 7A:
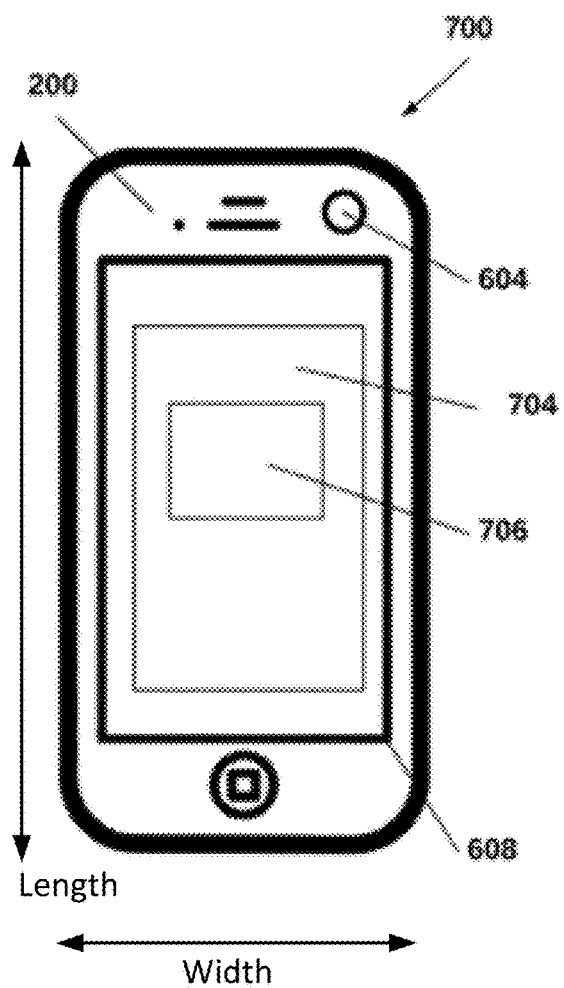
FIGS. 7A-B illustrate an exemplary electroadhesion device holder integrated into a smartphone.
Figure 7B:
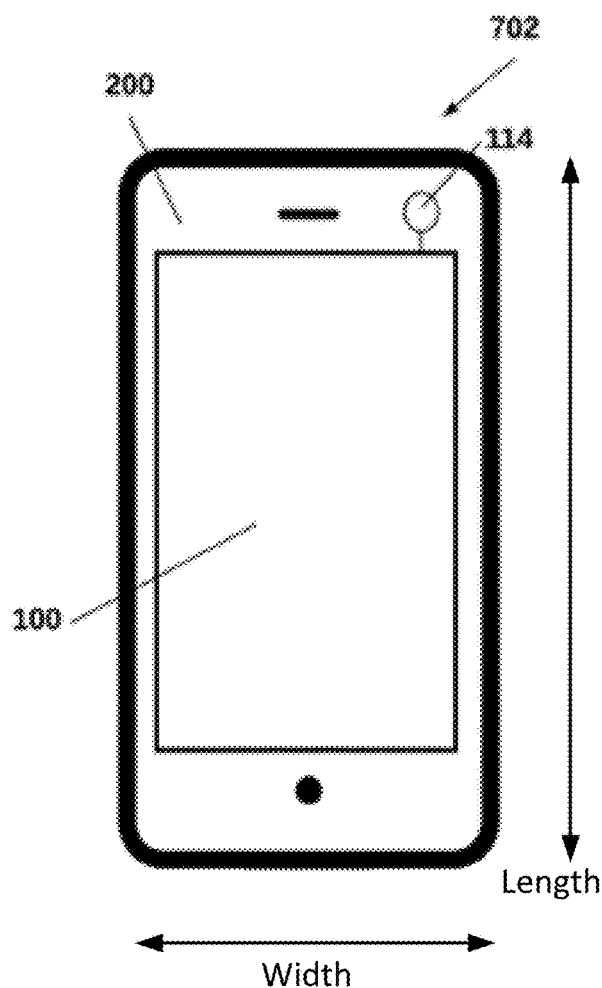

FIGS. 7A-B illustrate a flat front view 700 and a flat back view 702 of a preferred embodiment of an electroadhesion device 100 built into a device 200. As shown in FIG. 7A, the electroadhesion device 100 may be attached directly to a device 200 having a front camera 604 and a display screen 608. The display screen 608 may present one or more UI displays 704 that enable the user to input control commands for operating the electroadhesion device 100. For example, the UI display 704 may include a digital UI element 706 (e.g., a selectable button) that a user may select or otherwise interact with to actuate the electroadhesion device 100 and/or adjust the voltage output. In various embodiments, the device 200 may have an authentication mechanism for authenticating a user of the device 200. For example, the device 200 may have a fingerprint scan, face scan, or other biometric authentication mechanism; a password authentication mechanism; a multifactor authentication mechanism that requires access to another device; and the like. The authentication mechanism of the device 200 may be integrated with the UI display 704 and/or the electroadhesion device 100 to prevent an unauthorized user from accessing the UI display 704 and/or UI element 706 and/or accidentally generating and/or adjusting the voltage output. The authentication mechanism of the device 200 may be used as a safety mechanism in combination with—or in place of— the sensor and digital switch.

FIG. 7B illustrates the electroadhesion device 100 may be attached to the rear portion of the device 200 so that the device 200 may be mounted to a target surface with the display screen 608 and the front camera 604 visible. In various embodiments, the device 200 may be mounted to a target surface some distance away and some distance off the ground using the electroadhesvice device 100. Mounting the device 200 to the target surface may improve the perspective for viewing the screen 608 and/or the field of view of the front camera 604. The electroadhesion device 100 may be attached to the device 200 using any known attachment mechanism including a chemical adhesive, a mechanical fastener, a heat fastener (e.g., welded, spot welded, or spot-melted location), dry adhesion, Velcro, suction/vacuum adhesion, magnetic or electromagnetic attachment, tape (e.g.: single- or double-sided), and the like. The electroadhesion device 100 may also include one or more sensors 114 for measuring one or more characteristics of a target surface. Depending on the degree of device portability desired or needed for a given situation and the size of the electroadhesion device 100, the attachment mechanism may create a permanent, temporary, or removable form of attachment.

Figures 8A, 8B:
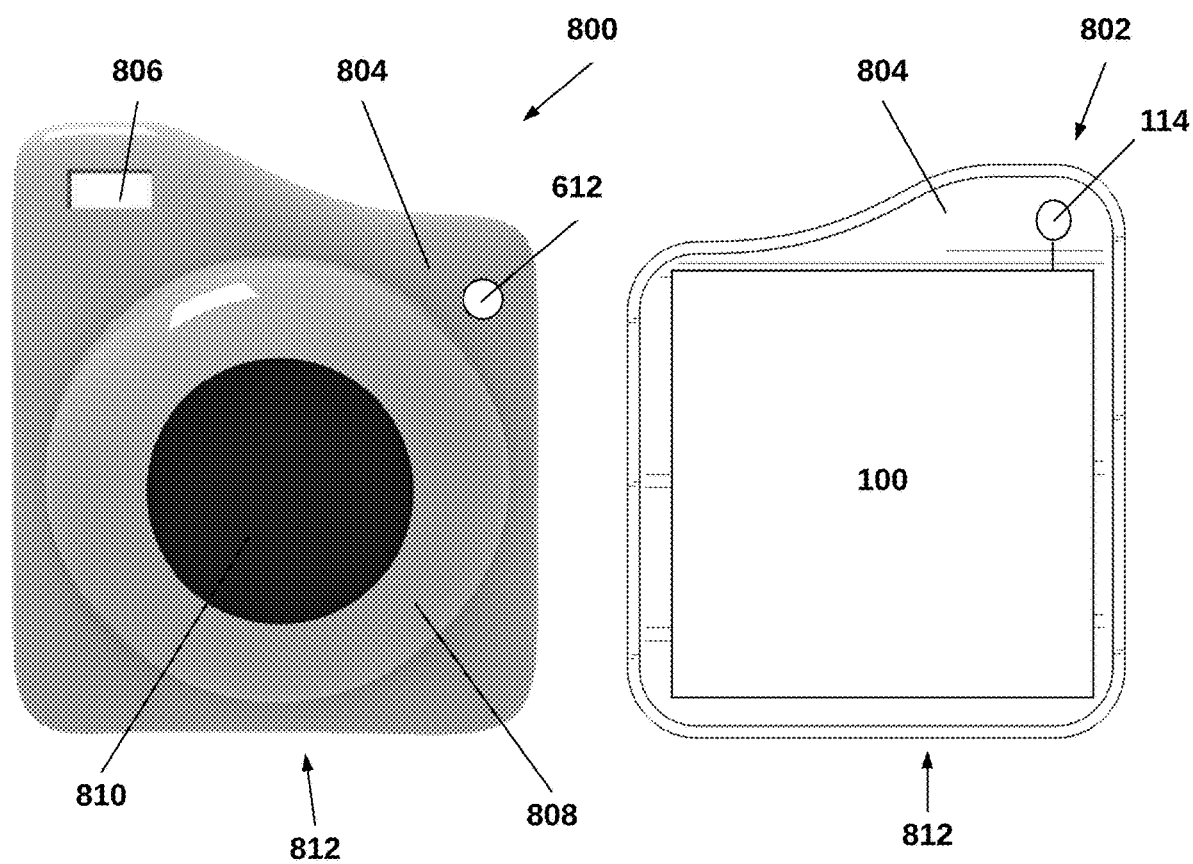
FIGS. 8A-B illustrate an exemplary electroadhesion device holder integrated into a camera.

FIGS. 8A-B illustrate a flat front view 800 and a flat back view 802 of a preferred embodiment of an electroadhesion device 100 integrated with a camera device 812. As shown in FIG. 8A, the electroadhesion device 100 may be attached directly to a camera device 812 having a housing 804, an eye portion 808, an opening 810, and a LED light 806. The housing 804 may dispose a circuit board including the electrical components (e.g., processor, control circuits, power source, image sensor, and the like) of the camera device 812. The housing 804 may include an eye portion 808 extending laterally out from the surface of the housing 804. The eye portion 808 may dispose one or more camera components (e.g., lens, image sensor, and the like). One end of the eye portion 808 includes an opening 810 to allow light to pass through the lens and reach the image sensor disposed inside the housing 804 and/or eye portion 808. An LED light 806 may be embedded in an exterior surface of the housing 804 to provide additional light (i.e., flash) to enable capture of selfie content in low light conditions.

A button 612, latch, or other mechanism for actuating the electroadhesion device 100 and/or adjusting the voltage output. The button 612, latch, or other mechanism may be attached to the front of the camera device 812. In various embodiments, a removable cover may be placed over the button 612, latch, or other mechanism. The removable cover may be used to prevent accidentally generating and/or adjusting the voltage output. The removable cover may be used as a safety mechanism in combination with—or in place of—the sensor and digital switch.

Figure 9:
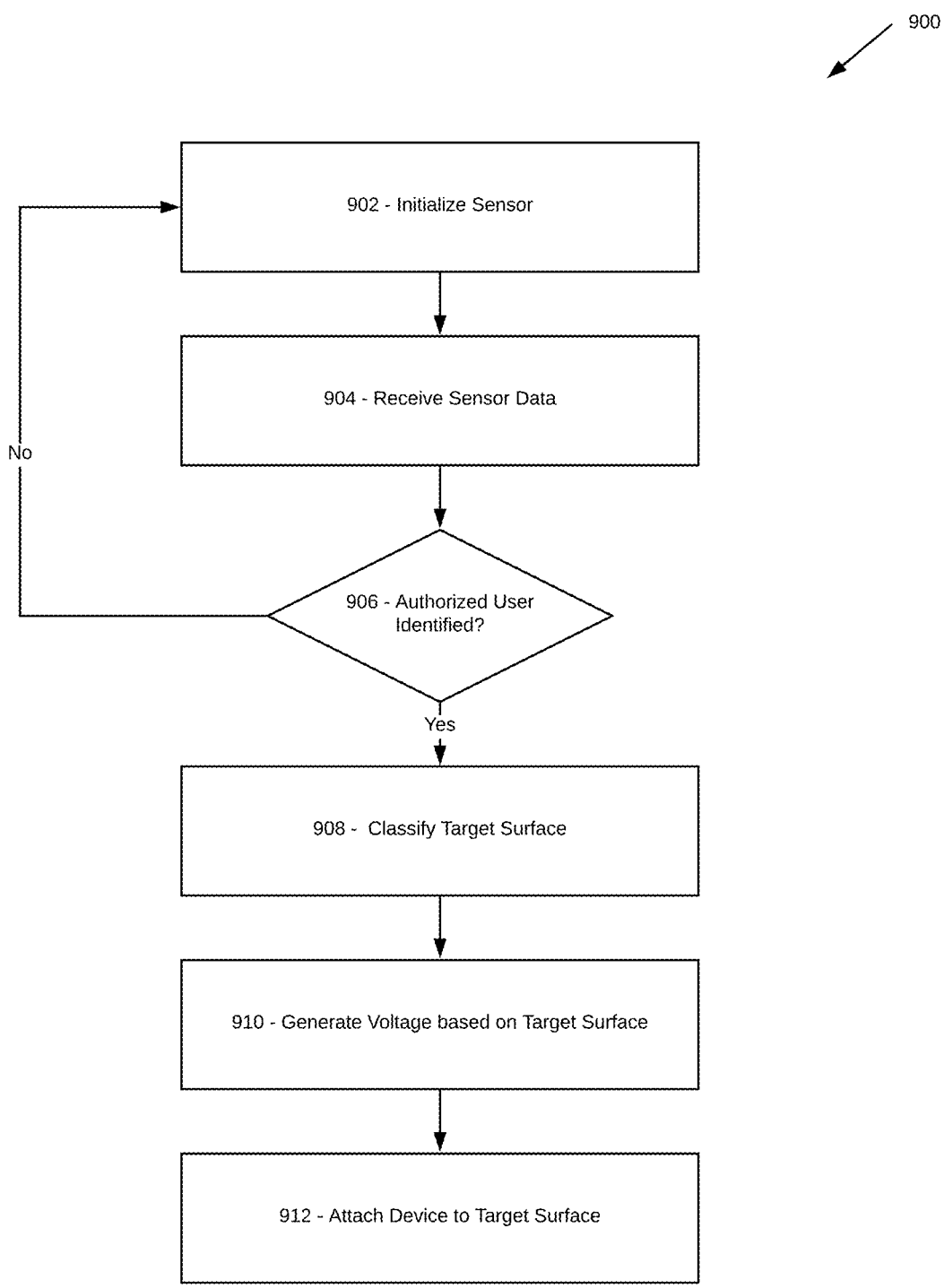
FIG. 9 is a flow chart illustrating an exemplary method of using the digital switch to regulate voltage generated by the electroadhesion device.

FIG. 8B illustrates the electroadhesion device 100 may be attached to the rear portion of the housing 804 so that the camera device 812 may be mounted to a target surface with the eye portion 808 opening 810 unobstructed. In various embodiments, the camera device 812 may be mounted to a target surface some distance away and some distance off the ground using the electroadhesion device 100. One or more sensors 114 may be attached to the electroadhesion device 100 for measuring one or more characteristics of the target surface. In response to sensor data collected by the one or more sensors 114, the voltage generated by the electroadhesion device 100 may be modified to fit the target surface. Mounting the camera device 812 to the target surface may improve the perspective captured by—and/or the field of view of—the camera device 812. The electroadhesion device 100 may be attached to the camera device 812 using any known attachment mechanism including a chemical adhesive, a mechanical fastener, a heat fastener (e.g., welded, spot welded, or spot-melted location), dry adhesion, Velcro, suction/vacuum adhesion, magnetic or electromagnetic attachment, tape (e.g.: single- or double-sided), and the like. Depending on the degree of camera device 812 portability desired or needed for a given situation and the size of the electroadhesion device 100, the attachment mechanism may create a permanent, temporary or even removable form of attachment FIG. 9 is a flow chart illustrating an exemplary method for regulating the voltage generated by an electroadhesion device 900. At 902, one or more sensors included in the electroadhesion device are initialized. In various embodiments, the sensors may be initialized automatically when the electroadhesion device is powered on, directed toward a target surface, moved, or in response to some other triggering event. The sensors may also be initialized in response to a user manually actuating the sensors and/or electroadhesion device by interacting with a mechanical (e.g., button) or digital (e.g., UI element) actuation mechanism.

Once the one or more sensors are initialized, the sensors may collect sensor data. Sensor data from the one or more sensors is received at 904. Sensors may include conductivity sensors (e.g., electrode conductivity sensors, induction conductivity sensors, and the like); Hall effect sensors and other magnetic field sensors; porosity sensors (e.g., time domain reflectometry (TDR) porosity sensors); wave form sensors (e.g., ultrasound sensors, radar sensors, infrared sensors, dot field projection depth sensors, time of flight depth sensors); motion sensors; and the like. Sensor data may also include image data collected by cameras and other image sensors.

At 906, sensor data may be used to validate a user of the electroadhesion device as an authorized user. To determine if a user is an authorized user, a camera included in the elctroadhesion device may capture an image of the user. The image may be transferred to the data analysis module and classified as an authorized user by a machine learning system trained to recognize images of people identified by the owner of the electroadhesion device as authorized users. To detect authorized users, the electroadhesion device may also be integrated with a face scan app (e.g., iOS Face Scan) or other facial scanning technology built into a smart phone or other consumer device integrated with the electroadhesion device. If the data analysis module identifies an authorized user at 906, the sensor and/or data analysis module will classify the target surface at 908. If the data analysis module does not identify an authorized user at 906, the electroadhesion device will terminate one or more processes and/or power down and wait for the sensor to be initialized by an authorized user at 902.

At 908, the sensor and/or data analysis module may classify the target surface by determining one or more characteristics of the target surface using sensor data. For example, sensor data may be used to determine the target surface's conductivity and other electrical or magnetic characteristics; the material's porosity, permeability, surface morphology, hardness, smoothness, and other surface characteristics; and the like. One or more characteristics determined from sensor data may be used to control the digital switch directly to generate voltage based on the target surface at 910. Sensor data may also be sent to a data analysis module. The data analysis module may refine the sensor data and use it to determine a characteristic and/or material type (e.g., metal, wood, plastic, ceramic, concreate, drywall, glass, stone, and the like) for the target surface. The digital switch 116 may then control the voltage output from the voltage converter at 910 based on the characteristic and/or material type for the target surface determined by the data analysis module.

At 910, the digital switch operates the voltage converter to generate voltage based on the target surface. The digital switch may autonomously modify the voltage output of the voltage converter depending on the target surface to eliminate sparks, fires, electric shocks, and other safety hazards that may result from applying too much voltage to a target surface. For example, if a sensor detects a conductive target surface (e.g., metal) the digital switch may operate the voltage converter to generate a low voltage. If the sensor detects an organic target surface (e.g., wood, drywall, fabric, and the like) the digital switch may operate the voltage converter to generate a medium voltage. If the sensor detects a smooth target surface (e.g., glass) or an insulating target surface (e.g., plastic, stone, sheetrock, ceramics, and the like), the digital switch may operate the voltage converter to generate a high voltage.

At 912, once the voltage converter generates a voltage output that is safe to apply to the target surface, the electroadhesion device may be attached to the target surface. To attach the electroadhesion device, the device may be placed into contact with—and/or in close proximity to—the target surface. When the electroadhesion device is moved to a new target surface, the sensor may automatically detect one or more characteristics of the new target surface and classify the new target surface. The digital switch may then modify and/or maintain the voltage output generated by the voltage converter based on the material type and/or characteristics for the new target surface. Additionally, if the sensor detects the electroadhesion device is moved away from a target surface, the digital switch may power down the voltage converter and/or otherwise terminate voltage output from the voltage converter until a new target surface is detected by the sensor.

The foregoing description is intended to convey a thorough understanding of the embodiments described by providing a number of specific exemplary embodiments and details involving electroadhesion device holders. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs.

Methods described herein may represent processing that occurs within a device (e.g., the electroadhesion device 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including, by ways of example, semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

As used herein, the terms "and/or" and "at least one of" include any and all combinations of one or more of the associated listed items.

Certain details are set forth in the foregoing description and in FIGS. 1-9 to provide a thorough understanding of various embodiments of the present invention. Other details describing well-known structures and systems often associated with electroadhesion, mounting systems, user devices, and server devices, etc., however, are not set forth below to avoid unnecessarily obscuring the description of the various embodiments of the present invention.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. An electroadhesion device holder comprising:
a device case wherein the device case having a length, a width, a depth, a front side configured to attach to a computer device, and a generally flat back side spanning the length and the width; and
an electroadhesion device integrated into the generally flat back side of the device case, and covering most of the back side of the device case, the electroadhesion device including:
a compliant film, comprising one or more electrodes, disposed in an insulating material, the insulating material including a chemical adhesive applied to at least one side of the insulating material;
a power supply connected to the one or more electrodes;
a sensor integrated into the electroadhesion device, the sensor configured to collect sensor data measuring one or more characteristics of a generally flat surface of a foreign object including a material type and insulation properties of the generally flat surface of the foreign object as well as sense proximity to the foreign object; and a digital switch in communication with the sensor, the digital switch configured to generate, modify, set, and maintain an adjustable output voltage used to attach the electroadhesion device to the generally flat surface of the foreign object, based on the sensor data regarding the material type and insulation properties of the generally flat surface of the foreign object, wherein the adjustable voltage output of the one or more electrodes generates an electroadhesive force that secures the electroadhesion device to the generally flat surface of the foreign object.

2. The electroadhesion device holder of claim 1, wherein the digital switch controls the adjustable voltage output by operating a voltage converter to generate the adjustable voltage output by converting a low voltage from the power supply into the voltage output.

3. The electroadhesion device holder of claim 2, wherein the digital switch is configured to operate the voltage converter to modify the adjustable voltage output based on one or more characteristics of the foreign object measured by the sensor.

4. The electroadhesion device holder of claim 1, wherein the electroadhesive force secures the electroadhesion device to the foreign object by:
generating the adjustable voltage output at the one or more electrodes;
inducing, by the adjustable voltage output, electric charges on the foreign object; and
interfacing the electric charges on the foreign object with opposite electric charges on the one or more electrodes to create an electroadhesive attraction.

5. The electroadhesion device holder of claim 1, further comprising:
a sensor actuation mechanism configured to actuate the sensor in response to a manual input received from a user; and
a status light configured to visibly display a status state of the sensor.

6. The electroadhesion device holder of claim 1, wherein the sensor comprises an electrode conductivity sensor, induction conductivity sensor, Hall effect sensor, magnetic field sensor, porosity sensor, time domain reflectometry (TDR) porosity sensor, motion sensor, ultrasound sensor, radar sensor, infrared sensor, dot field projection depth sensor, or time of flight depth sensor.

7. The electroadhesion device holder of claim 1, wherein the one or more characteristics of the foreign object includes at least one of conductivity, electrical characteristics, magnetic characteristics, porosity, permeability, surface morphology, surface profile, or surface texture.

8. The electroadhesion device holder of claim 1, wherein the foreign object is formed from at least one of metal, wood, plastic, ceramic, concreate, drywall, glass, or stone.

9. The electroadhesion device holder of claim 1, wherein the electroadhesion device holder is a smartphone case.

10. The electroadhesion device holder of claim 1, wherein the length and width of the device case are both multiple times longer than the depth of the device case.

11. The electroadhesion device holder of claim 1, further comprising a receiving coil for converting a wireless charging signal into electricity to charge the power supply.

12. A device comprising:
a smartphone case with a generally flat back side having an integrated electroadhesion device, the integrated electroadhesion device including,
a compliant film comprising one or more electrodes disposed in an insulating material, the insulating material including a chemical adhesive applied to at least one side of the insulating material;
the integrated electroadhesion device including a power supply connected to the one or more electrodes;
the integrated electroadhesion device including a sensor integrated into the integrated electroadhesion device, the sensor configured to collect sensor data measuring one or more characteristics of a generally flat surface of a foreign object including a material type of the foreign object;
a signal status light configured to turn red when the sensor is sensing the foreign object and has not determined a proper adjustable voltage, the signal status light configured to turn green when the sensor is sensing the foreign object and determined a proper adjustable voltage for the foreign object; and
the integrated electroadhesion device including a digital switch in communication with the sensor, the digital switch configured to generate, modify, set, and maintain an adjustable output voltage used to attach the electroadhesion device to the generally flat surface of the foreign object, based on the sensor data regarding the material type and insulation properties of the generally flat surface of the foreign object,
wherein the adjustable voltage output of the one or more electrodes generates an electroadhesive force that secures the integrated electroadhesion device to the generally flat surface of the foreign object.

13. The device of claim 12, wherein the digital switch controls the adjustable voltage output by operating a voltage converter to generate the adjustable voltage output by converting a low voltage from the power supply into the voltage output.

14. The device of claim 13, wherein the digital switch is configured to operate the voltage converter to modify the adjustable voltage output based on one or more characteristics of the foreign object measured by the sensor.

15. The device of claim 12, wherein the electroadhesive force secures the integrated electroadhesion device to the foreign object by:
generating the adjustable voltage output at the one or more electrodes;
inducing, by the adjustable voltage output, electric charges on the foreign object; and
interfacing the electric charges on the foreign object with opposite electric charges on the one or more electrodes to create an electroadhesive attraction.

16. The device of claim 12, wherein the integrated electroadhesion device is integrated with the device using at least one of a chemical adhesive, a mechanical fastener, a heat fastener, dry adhesion, Velcro, suction adhesion, vacuum adhesion, magnetic tape, and electromagnetic tape.

17. The device of claim 12, wherein the integrated electroadhesion device is removably attached to a surface of the device.

18. The device of claim 12, where in the device is a smartphone, camera, personal computer, laptop, tablet computer, or television.

19. A method of regulating voltage generated by an electroadhesion computer device holder, the method comprising:
- receiving sensor data from one or more sensors of an electroadhesion device integrated into the electroadhesion computer device holder, wherein the electroadhesion computer device holder includes a back with a generally flat surface and a front configured to secure to a device;
- determining one or more material and insulation characteristics of a generally flat surface of a foreign object based on the sensor data;
- determining a distance from a generally flat surface of a foreign object to the electroadhesion device based on the sensor data;
- generating, modifying, setting, and maintaining by a voltage converter of the electroadhesion device, an adjustable voltage applied to one or more electrodes of the electroadhesion device, controlled by a digital switch of the electroadhesion device based on the one or more characteristics of the generally flat surface of the foreign object including insulation properties and material type and determined distance; and
- generating an electroadhesive force by interactions between electric charges on the one or more electrodes and opposite electric charges on the generally flat surface of the foreign object induced by the adjustable voltage for attaching the electroadhesion computer device holder to the generally flat surface of the foreign object.

20. The method of claim 19, further comprising;
- determining the foreign object is conductive based on the sensor data; and
- in response to determining the foreign object is conductive, generating a low adjustable voltage that can safely interface with the conductive foreign object.

21. The method of claim 19, further comprising:
- determining the foreign object is insulating based on the sensor data; and
- in response to determining the foreign object is insulating, generating a high adjustable voltage that can safely interface with the insulating foreign object.

* * * * *